(12) United States Patent
Yamamoto et al.

(10) Patent No.: US 11,855,699 B2
(45) Date of Patent: Dec. 26, 2023

(54) OPTICAL TRANSMISSION SYSTEM, OPTICAL TRANSMITTING APPARATUS AND OPTICAL RECEIVING APPARATUS

(71) Applicant: NIPPON TELEGRAPH AND TELEPHONE CORPORATION, Tokyo (JP)

(72) Inventors: Shuto Yamamoto, Musashino (JP); Masanori Nakamura, Musashino (JP); Hiroki Taniguchi, Musashino (JP); Yoshiaki Kisaka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/785,833

(22) PCT Filed: Dec. 18, 2019

(86) PCT No.: PCT/JP2019/049637
§ 371 (c)(1),
(2) Date: Jun. 15, 2022

(87) PCT Pub. No.: WO2021/124483
PCT Pub. Date: Jun. 24, 2021

(65) Prior Publication Data
US 2023/0071063 A1 Mar. 9, 2023

(51) Int. Cl.
*H04B 10/516* (2013.01)
*H04B 10/61* (2013.01)

(52) U.S. Cl.
CPC ....... *H04B 10/5161* (2013.01); *H04B 10/612* (2013.01)

(58) Field of Classification Search
None
See application file for complete search history.

(56) References Cited

U.S. PATENT DOCUMENTS

2012/0141144 A1* 6/2012 Cai ............ H04B 10/616
398/202
2013/0272704 A1* 10/2013 Zamani ............ H04J 14/06
398/65

(Continued)

FOREIGN PATENT DOCUMENTS

WO WO-2017221926 A1 * 12/2017 ............ H03M 13/29

OTHER PUBLICATIONS

Shuto Yamamoto et al., 92-Gbaud PAM4 Transmission using Spectral-Shaping Trellis-Coded-Modulation with 20-GHz Bandwidth Limitation, 2019 Optical Fiber Communications Conference and Exhibition (OFC), Mar. 7, 2019.

*Primary Examiner* — David W Lambert
(74) *Attorney, Agent, or Firm* — Harness, Dickey & Pierce, P.L.C.

(57) ABSTRACT

An optical transmitter generates symbols for transmission by applying a predetermined coding method to each of m-valued transmission symbols generated from transmission data, generates signal light by performing optical modulation on the basis of the symbols for transmission, and transmits the signal light. An optical receiver generates a series of digital signals from the received signal light, detects coded symbols by applying predetermined digital signal processing to the series of digital signals, decodes the m-valued transmission symbols from the detected coded symbols, and restores the transmission data from the decoded m-valued transmission symbols. An operation based on the predetermined coding method performs nonlinear coding that generates the coded symbols by generating m-valued intermediate symbols from the m-valued transmission symbols, the nonlinear coding restricting transitions between series of the coded symbols in time series by assigning bit information to a state transition between coded symbols adjacent in time series and making (Continued)

a number of states that each of the coded symbols can take on greater than a number of states of the m-valued transmission symbols.

7 Claims, 14 Drawing Sheets

(56) References Cited

U.S. PATENT DOCUMENTS

| | | | |
|---|---|---|---|
| 2016/0105246 A1* | 4/2016 | Xie | H04J 14/04 |
| | | | 398/202 |
| 2017/0155468 A1* | 6/2017 | Zocchi | A23L 33/10 |
| 2017/0272207 A1* | 9/2017 | Oveis Gharan | H04L 1/0042 |
| 2018/0269983 A1* | 9/2018 | Karar | H04J 14/06 |
| 2019/0288793 A1* | 9/2019 | Nakamura | H03M 13/29 |

* cited by examiner

OPTICAL TRANSMISSION SYSTEM, OPTICAL TRANSMITTING APPARATUS AND OPTICAL RECEIVING APPARATUS

CROSS-REFERENCE TO RELATED APPLICATIONS

This application is a 371 U.S. National Phase of International Application No. PCT/JP2019/049637, filed on Dec. 18, 2019. The entire disclosure of the above application is incorporated herein by reference.

TECHNICAL FIELD

The present invention relates to an optical transmission system, an optical transmitter, and an optical receiver.

BACKGROUND ART

As the demand for data communication increases, optical transmission networks using optical signal modulation techniques and optical signal multiplexing techniques, which enable the transmission of high-volume traffic, are becoming more and more popular. In particular, digital coherent technology which is a combination of coherent detection and digital signal processing techniques is becoming widely used in ultra-high-speed optical transmission systems with a transmission rate of 100 Gb/s (Gigabit/second) or higher per wave.

In contrast, with the spread of high-volume data communication by mobile terminals typified by LTE (Long Term Evolution), there is a need to realize 100 Gb/s-level ultra-high-speed optical transmission at lower cost and with simpler optical transmitter/receiver configurations. The direct detection method, which demodulates data signals based on strength information of optical signals, has been attracting attention as a method for realizing 100 Gb/s-level ultra-high-speed optical transmission using a simple configuration. In particular, an ultra-high-speed optical transmission method using PAM4 (4-level Pulse Amplitude Modulation), which is a four-level strength modulation scheme having higher frequency utilization efficiency than NRZ (Non Return-to-Zero), which is a binary strength modulation signal, is being investigated.

PDM-QPSK (Polarization Division Multiplexing-Quadrature Phase Shift Keying; Polarization Division Multiplexing QPSK) is generally used in 100 Gb/s-level optical transmission using digital coherent technology, which has been commercialized as a long-distance transmission technology. The modulation rate of PDM-QPSK is about 25 Gbaud (Giga baud).

On the other hand, in the case of 100 Gb/s-level ultra-high-speed optical transmission using the PAM4 method, which can be realized by a simple optical transmitter/receiver configuration, the modulation rate will be about 50 Gbaud, and the signal spectrum will be a signal spectrum occupying a wider frequency than PDM-QPSK. This means that when 100 Gb/s-level ultra-high-speed optical transmission is performed, the PAM4 method is much more affected by waveform deterioration occurring due to filtering caused by the bandwidth of electro-optical devices than the PDM-QPSK method.

In the direct detection method, waveform deterioration caused by wavelength dispersion of the optical fiber used in the transmission line cannot be compensated for by digital signal processing. Therefore, signal quality deterioration due to wavelength dispersion is also a major problem when employing the PAM4 method. The signal quality deterioration due to wavelength dispersion is proportional to the square of the modulation rate. As such, the signal quality deterioration caused by wavelength dispersion is particularly marked in signals modulated to optical speeds of 50 Gbaud or higher.

CITATION LIST

Non Patent Literature

[NPL 1] Shuto Yamamoto, et. al, "92-Gbaud PAM4 Transmission Using Spectral-Shaping Trellis-Coded-Modulation with 20-GHz Bandwidth Limitation", Proceeding of OFC2019, W4I.5 (2019)

SUMMARY OF THE INVENTION

Technical Problem

As described above, the PAM4 method is being considered as a method for realizing 100 Gb/s-level ultra-high-speed optical transmission using a simple configuration, and to realize 100 Gb/s-level ultra-high-speed optical transmission using the PAM4 method, signal quality deterioration caused by the bandwidth limitations of electro-optical devices is an issue.

To address this issue, a method has been proposed that achieves improved bandwidth limitation tolerance by using nonlinear trellis coding suited to PAM4 signals (see NPL 1, for example). In this method, coding is performed by converting a pre-coding signal $u_n$ into a post-coding signal $v_n$ through the operation indicated in the following Equation (1).

[Math 1]
$$v_n = u_n + \left[\frac{v_{n-1}}{2}\right] \quad (1)$$

Additionally, in this method, decoding is also performed by converting $v_n$ to $u_n$ through the operation indicated in the following Equation (2). Applying this coding method makes it possible to narrow the signal spectrum, which in turn improves the bandwidth limitation tolerance.

[Math 2]
$$u_n = v_n - \left[\frac{v_{n-1}}{2}\right] \quad (2)$$

In Equations (1) and (2), the symbol [•] is a Gauss symbol, and "n" is a parameter representing time. As can be seen from Equation (2), the decoding to obtain $u_n$ is performed using $v_n$ and $v_{n-1}$. The decoding to obtain $u_{n+1}$ is performed using $v_{n+1}$ and $v_n$. Therefore, for example, if a wrong judgment is made for $v_n$, a wrong result will be obtained not only for $u_n$, which is calculated on the basis of that information, but also for $u_{n+1}$. In other words, a symbol determination error for $v_n$ will induce two symbol determination errors, for $u_n$ and $u_{n+1}$.

As a method for avoiding this, it is conceivable to use a decoding method based on maximum likelihood sequence estimation (MLSE). However, MLSE generally requires a large amount of computing resources to execute, which leads to increased costs of optical transmitters/receivers. Accordingly, it conventionally has not been possible to narrow the signal spectrum while suppressing costs.

In light of the foregoing circumstances, an object of the present invention is to provide a technique that can narrow a signal spectrum while suppressing costs.

Means for Solving the Problem

One aspect of the present invention is an optical transmission system including an optical transmitter that transmits signal light and an optical receiver that receives the signal light. The optical transmitter includes: a signal coding unit that generates a symbol for transmission by applying a predetermined coding method to a series of m-valued transmission symbols generated from transmission data; and a transmission unit that generates the signal light by performing optical modulation on the basis of the symbol for transmission, and transmits the generated signal light. The optical receiver includes: a reception unit that receives the signal light and generates a series of digital signals from the received signal light; and a digital signal processing unit that detects a coded symbol by applying predetermined digital signal processing to the series of digital signals, decodes the m-valued transmission symbol from the detected coded symbol, and restores the transmission data from the decoded m-valued transmission symbol. An operation based on the predetermined coding method includes an operation of generating the coded symbol as the symbol for transmission or includes an operation of generating an intermediate symbol as the symbol for transmission through nonlinear coding that generates the coded symbol by generating an m-valued intermediate symbol from the m-valued transmission symbol, the nonlinear coding restricting transitions between series of the coded symbols in time series by assigning bit information to a state transition between coded symbols adjacent in time series and making a number of states that each of the coded symbols can take on greater than a number of states of the m-valued transmission symbol, and when the intermediate symbol is generated as the symbol for transmission through the predetermined coding method, the coded symbol is generated from the intermediate symbol through the predetermined digital signal processing.

One aspect of the present invention is the optical transmitter of the above-described optical transmission system, wherein when generating the coded symbol as the symbol for transmission through the predetermined coding method, assuming each of the m-valued transmission symbols at a time n is represented by $u_n$ and each of the coded symbols is represented by $v_n$, the signal coding unit generates an M-valued coded symbol $v_n$ as the symbol for transmission through the predetermined coding method that performs the nonlinear coding represented by Equation (5) and Equation (6), which are indicated by $\alpha_j$, which is a real number no less than 0 and no greater than 1 and that is predetermined such that M>m, a Gauss symbol [•] indicating a Gaussian operation, and mod (•, m) indicating an operation for finding a remainder value from dividing by m, and the transmission unit transmits the signal light generated based on the coded symbol $v_n$.

One aspect of the present invention is the optical transmitter of the above-described optical transmission system, wherein when generating the coded symbol as the symbol for transmission through the predetermined coding method, assuming each of the m-valued transmission symbols at a time n is represented by $u_n$ and each of the coded symbols is represented by $v_n$, the signal coding unit generates an M-valued coded symbol $v_n$ as the symbol for transmission through the predetermined coding method that performs the nonlinear coding represented by Equation (13) and Equation (14), which are indicated by $\beta_j$, which is a real number no less than 0 and no greater than 1, $\alpha_j$, which is a real number no less than 0 and no greater than 1 and that is predetermined such that M>m, a Gauss symbol [•] indicating a Gaussian operation, and mod (•, m) indicating an operation for finding a remainder value from dividing by m, and the transmission unit transmits the signal light generated based on the coded symbol $v_n$.

One aspect of the present invention is the optical transmitter of the above-described optical transmission system, further including an I component signal generation unit and a Q component signal generation unit that each generates the m-valued transmission symbol on the basis of the transmission data when the coded symbol is generated as the symbol for transmission through the predetermined coding method. Assuming each of the m-valued transmission symbols at a time n is represented by $u_n$ and each of the coded symbols is represented by $v_n$, each signal coding unit generates an M-valued coded symbol $v_n$ as the symbol for transmission through the predetermined coding method that performs the nonlinear coding represented by Equation (5) and Equation (6), which are indicated by $\alpha_j$, which is a real number no less than 0 and no greater than 1 and that is predetermined such that M>m, a Gauss symbol [•] indicating a Gaussian operation, and mod (•, m) indicating an operation for finding a remainder value from dividing by m, and takes the generated coded symbols $v_n$ as a coded symbol $vi_n$ and a coded symbol $vq_n$, respectively, and the transmission unit transmits the signal light generated based on the coded symbol $vi_n$ and the coded symbol $vq_n$.

One aspect of the present invention is the above-described optical transmitter, when the coded symbol is generated as the symbol for transmission through the predetermined coding method of the above-described optical transmission system, the optical transmitter further including an I component signal generation unit and a Q component signal generation unit that each generates the m-valued transmission symbol on the basis of the transmission data. Assuming each of the m-valued transmission symbols at a time n is represented by $u_n$ and each of the coded symbols is represented by $v_n$, each signal coding unit generates an M-valued coded symbol $v_n$ as the symbol for transmission through the predetermined coding method that performs the nonlinear coding represented by Equation (13) and Equation (14), which are indicated by $\beta_j$, which is a real number no less than 0 and no greater than 1, $\alpha_j$, which is a real number no less than 0 and no greater than 1 and that is predetermined such that M>m, a Gauss symbol [•] indicating a Gaussian operation, and mod (•, m) indicating an operation for finding a remainder value from dividing by m, and takes the generated coded symbols $v_n$ as a coded symbol vin and a coded symbol $vq_n$, respectively, and the transmission unit transmits the signal light generated based on the coded symbol $vi_n$ and the coded symbol $vq_n$.

One aspect of the present invention is the optical receiver of the above-described optical transmission system, wherein the reception unit: receives the signal light to be transmitted by the above-described optical transmitter, and generates the series of digital signals by directly detecting the received signal light, and the digital signal processing unit: detects the coded symbol $v_n$ by applying the predetermined digital signal processing to the series of digital signals, decodes the m-valued transmission symbol by calculating a remainder obtained by dividing each of the detected coded symbols $v_n$ by m, and restores the transmission data from the decoded series of m-valued transmission symbols.

One aspect of the present invention is the optical receiver of the above described optical transmission system, wherein the reception unit: receives the signal light to be transmitted by the above-described optical transmitter, and generates two types of the series of digital signals by coherent detection of the received signal light, and the digital signal processing unit: applies the predetermined digital signal processing to each of the two types of the series of digital signals, detects the M-valued coded symbol $vi_n$ of the I component and the M-valued coded symbol $vq_n$ of the Q component, decodes the m-valued transmission symbol of the I component by calculating a remainder obtained by dividing each of the detected m-valued coded symbols $vi_n$ of the I component by m, decodes the m-valued transmission symbol of the Q component by calculating a remainder obtained by dividing each of the detected m-valued coded symbols $vq_n$ of the Q component by m, and restores the transmission data from each of the series of decoded m-valued transmission symbols of the I component and the Q component.

Effects of the Invention

The present invention makes it possible to narrow the signal spectrum while suppressing costs.

DESCRIPTION OF EMBODIMENTS

Embodiments of the present invention will be described hereinafter with reference to the drawings.

First Embodiment

Figure 1:
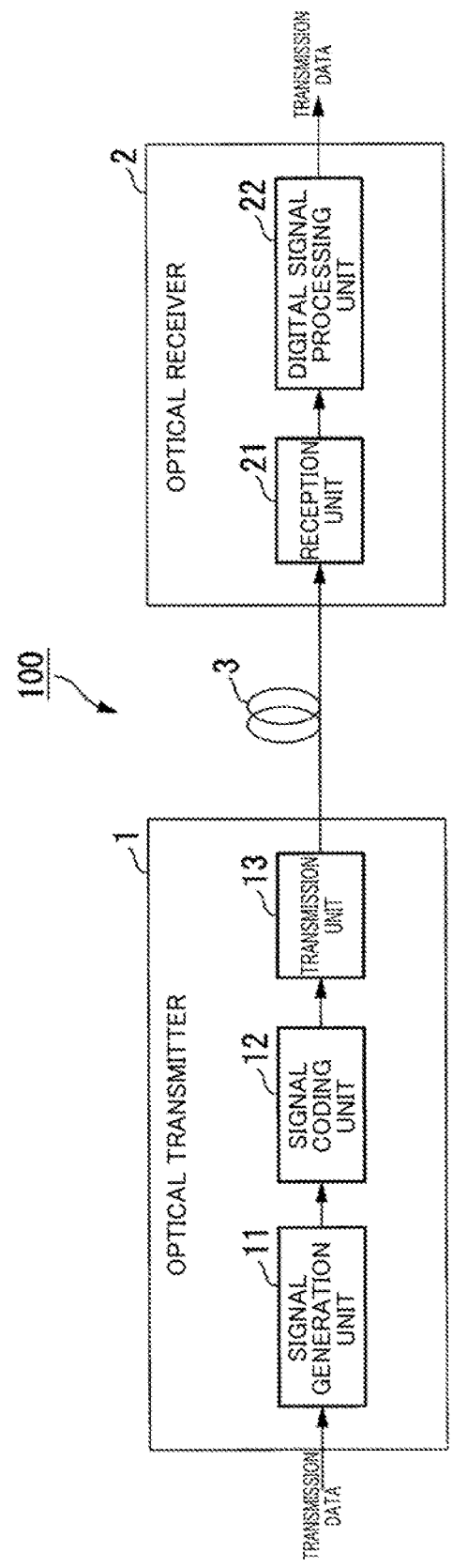
FIG. 1 is a block diagram illustrating the configuration of an optical transmission system according to a first embodiment.

FIG. 1 is a block diagram illustrating the configuration of an optical transmission system 100 according to a first embodiment. The optical transmission system 100 includes an optical transmitter 1 and an optical receiver 2. The optical transmitter 1 and the optical receiver 2 are communicably connected to each other by an optical fiber transmission line 3. The optical fiber transmission line 3 transmits optical signals transmitted by the optical transmitter 1 to the optical receiver 2. The optical fiber transmission line 3 is constituted by optical fibers that connect the optical transmitter 1 and the optical receiver 2.

The optical transmitter 1 includes a signal generation unit 11, a signal coding unit 12, and a transmission unit 13. The signal generation unit 11 generates a series of m-valued transmission symbols by mapping bit data of transmission data supplied from the outside to one of m-valued symbols. For example, if m=4, a series of four-valued transmission symbols is generated by mapping two bits each of the bit data of the transmission data to one of the four-valued symbols. When "n" is a parameter representing time and the m-valued transmission symbols in a time slot n are represented by $u_n$, the signal generation unit 11 generates a series of m-valued transmission symbols with $u_n \in \{0, 1, 2, \ldots, m-1\}$ from the transmission data.

Each transmission symbol is assigned two bits that are coded, e.g., Gray coded, in advance such that the Hamming distance between adjacent transmission symbols is 1. For example, when Gray coding for m=4 is performed, bit "01" is assigned to transmission symbol "0", "00" to transmission symbol "1", bit "10" to transmission symbol "2", and bit "11" to transmission symbol "3".

A predetermined coding method is applied to the signal coding unit 12. This coding method is nonlinear coding that assigns bit information to the state transitions between coded symbols adjacent in time series for the series of m-valued transmission symbols generated by the signal generation unit 11, increases a number of states that the coded symbols can take over the number of states of the m-valued transmission symbols, and limits transitions between the series of coded symbols in time series. As a result, the signal coding unit 12 generates M-valued coded symbols which have a higher number of symbols than the m-valued transmission symbols.

Figure 2:
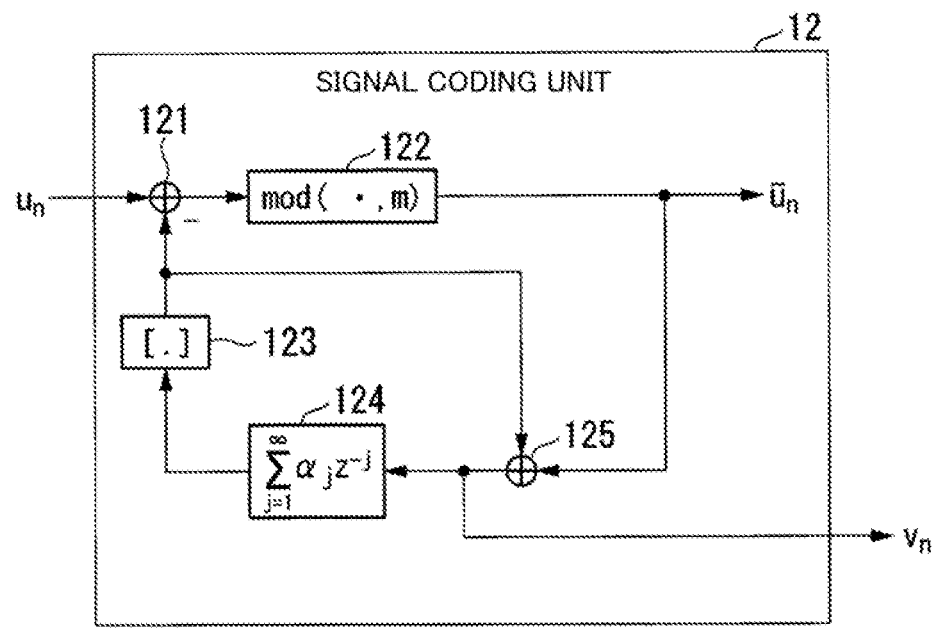
FIG. 2 is a block diagram illustrating the internal configuration of a signal coding unit according to the first embodiment.

FIG. 2 is a block diagram illustrating the internal configuration of the signal coding unit 12. The signal coding unit 12 includes a subtractor 121, a remainder calculation unit 122, a Gaussian operation unit 123, a delay computation unit 124, and an adder 125.

The subtractor 121 sequentially takes a series of m-valued transmission symbols $u_n$ and subtracts an output value of the Gaussian operation unit 123 from $u_n$. The subtractor 121 outputs the subtraction value obtained by the subtraction to the remainder calculation unit 122. The remainder calculation unit 122 performs a remainder operation represented by the mathematical symbol mod (•, m), i.e., an operation of dividing the subtraction value output by the subtractor 121 by m to calculate a remainder. In the following, the remainder value calculated by the remainder calculation unit 122 is represented by the parameter indicated in Equation (3), and this parameter is called an intermediate symbol. Note that in Equation (3), "~" is shown above "u", but in the following descriptions, this will be written as "~u".

[Math 3]

$$\tilde{u}_n \quad (3)$$

The adder 125 calculates a coded symbol $v_n$ by adding the intermediate symbol $\sim u_n$ and the output value of the Gaussian operation unit 123. The delay computation unit 124 takes in the coded symbol $v_n$ calculated by the adder 125 in past time slots and performs the operation indicated in the following Equation (4), which calculates a sum by multiplying the coded symbol $v_n$ taken in by a coefficient of $\alpha_j$ corresponding to each time slot.

[Math 4]

$$\Sigma_{j=1}^{\infty} \alpha_j z^{-j} \quad (4)$$

Note that in Equation (4), "$\alpha_j$" is any real number satisfying $0 \leq \alpha_j \leq 1$. The Gaussian operation unit 123 performs a Gaussian operation, indicated by the mathematical symbol [•], on the output value of the delay computation unit 124, and outputs an integer value obtained from the Gaussian operation to the subtractor 121.

The coded symbol $v_n$, which is calculated by the adder 125, is expressed as the following Equation (5).

[Math 5]

$$v_n = \tilde{u}_n + [\Sigma_{j=1}^{\infty} \alpha_j v_{n-j}] \quad (5)$$

The intermediate symbol $\sim u_n$ calculated by the remainder calculation unit 122 is expressed as the following Equation (6).

[Math 6]

$$\tilde{u}_n = \mathrm{mod}\,(u_n - [\Sigma_{j=1}^{\infty} \alpha_j v_{n-j}], m) \quad (6)$$

As can be seen from Equation (6), the intermediate symbol $\sim u_n$ is an m-valued symbol, and is $\sim u_n \in \{0, 1, 2, \ldots, m-1\}$.

The signal coding unit 12 outputs the generated series of coded symbols $v_n$ to the transmission unit 13. The transmission unit 13 performs optical modulation on the basis of the series of coded symbols $v_n$ output by the signal coding unit 12 to generate signal light. The transmission unit 13 outputs the generated signal light to the optical fiber transmission line 3. The optical fiber transmission line 3 transmits the signal light output by the transmission unit 13 to the optical receiver 2.

The optical receiver 2 includes a reception unit 21 and a digital signal processing unit 22. The reception unit 21 receives the signal light transmitted by the optical fiber transmission line 3. The reception unit 21 converts the received signal light into an analog electrical signal, and converts the analog electrical signal into a digital signal to generate a series of digital signals. The reception unit 21 outputs the generated series of digital signals to the digital signal processing unit 22.

The digital signal processing unit 22 sequentially takes in the series of digital signals output by the reception unit 21, and performs predetermined digital signal processing and threshold determination processing on the taken-in digital signal series to detect the coded symbols $v_n$. The predetermined digital signal processing is, for example, signal processing for waveform shaping using a digital filter. The digital signal processing unit 22 performs the operation indicated by the following Equation (7) on the detected coded symbol $v_n$, i.e., an operation of dividing by m to calculate the remainder value.

[Math 7]

$$u_n = \mathrm{mod}\,(v_n, m) \quad (7)$$

The remainder value obtained by the operation of Equation (7) is the m-valued transmission symbol $u_n$, which makes it possible for the digital signal processing unit 22 to decode the m-valued transmission symbol $u_n$. The digital signal processing unit 22 restores the transmission data from the decoded series of m-valued transmission symbols $u_n$.

Here, the predetermined coding method performed by the signal coding unit 12 will be described, i.e., nonlinear coding that assigns bit information to the state transitions between coded symbols adjacent in time series, increases a number of states that the coded symbols can take over the number of states of the m-valued transmission symbols, and limits transitions between the series of coded symbols in time series.

The above Equation (5) for j=1 only is expressed as the following Equation (8).

[Math 8]

$$v_n = u_n + \alpha_1 v_{n-1} \quad (8)$$

Transforming Equation (8) results in Equation (9).

[Math 9]

$$v_n - \alpha_1 v_{n-1} = \tilde{u}_n \quad (9)$$

Equation (9) adds the information of the intermediate symbol $\sim u_n$ to the adjacent coded symbols of $v_n$ and $v_{n-1}$, which means that bit information is assigned to the state transition between coded symbols adjacent in time series. Equation (5) is an expression that extends this bit information assignment to a plurality of coded symbols, which means that the bit information of intermediate symbol $\sim u_n$ is attached to adjacent coded symbols according to the rule indicated in Equation (5). The application of the rule in Equation (5) also places restrictions on transitions between the series of coded symbols in time series.

The coded symbol $v_n$ obtained through Equation (5) is an M-valued symbol, where $v_n \in \{0, 1, 2, \ldots, M-1\}$. The number of states M of the coded symbol $v_n$ is a number determined by m and $\alpha_j$ in Equation (5). Therefore, by setting the value of $\alpha_j$ to an appropriate value beforehand so that M>m, the number of states of the coded symbol $v_n$ can be set to the number of states M, which is greater than the number of states m of the transmission symbol $u_n$. For example, assume that m=4, $\alpha_1 = \frac{1}{2}$, $\alpha_j = 0$ (j=2, 3, . . . ), i.e., $\alpha_j = 0$ for j=2, 3, . . . aside from j=1. In this case, M=6, which satisfies M>m.

The above Equation (5) and Equation (6) can be summarized as the following Equation (10).

[Math 10]

$$v_n = \begin{cases} u_n & \left(u_n \geq \left[\sum_{j=1}^{\infty} \alpha_j v_{n-j}\right]\right) \\ u_n + m & \left(u_n < \left[\sum_{j=1}^{\infty} \alpha_j v_{n-j}\right]\right) \end{cases} \quad (10)$$

As can be seen from Equation (10), the transmission symbol $u_n$ can be decoded by dividing the coded symbol $v_n$ by m to calculate the remainder value. Therefore, the digital signal processing unit 22 of the optical receiver 2 decodes the transmission symbol $u_n$ using the above Equation (7).

As indicated in the above Equation (7), the transmission symbol $u_n$ is a value determined only by the coded symbol $v_n$ and m, and does not depend on $v_{n-j}$ for j=2, 3, . . . aside from j=1. In other words, the nonlinear coding indicated by Equation (5) and Equation (6) is coding in which one symbol determination error in the coded signal does not induce two or more symbol determination errors for the uncoded signal.

The power spectrum of the signal of a series of coded symbols $v_n$ obtained through nonlinear coding as indicated by Equation (5) and Equation (6) has a structure in which the signal power is concentrated at low frequencies. For example, if $\alpha_1=\alpha$ and $\alpha_j=0$ (j=2, 3, . . . ) a power spectrum density S(f) is expressed as the following Equation (11).

[Math 11]

$$S(f) = \frac{(1-\alpha)^2}{1+\alpha^2 - 2\alpha\cos(2\pi f/f_B)} \quad (11)$$

Figure 3:
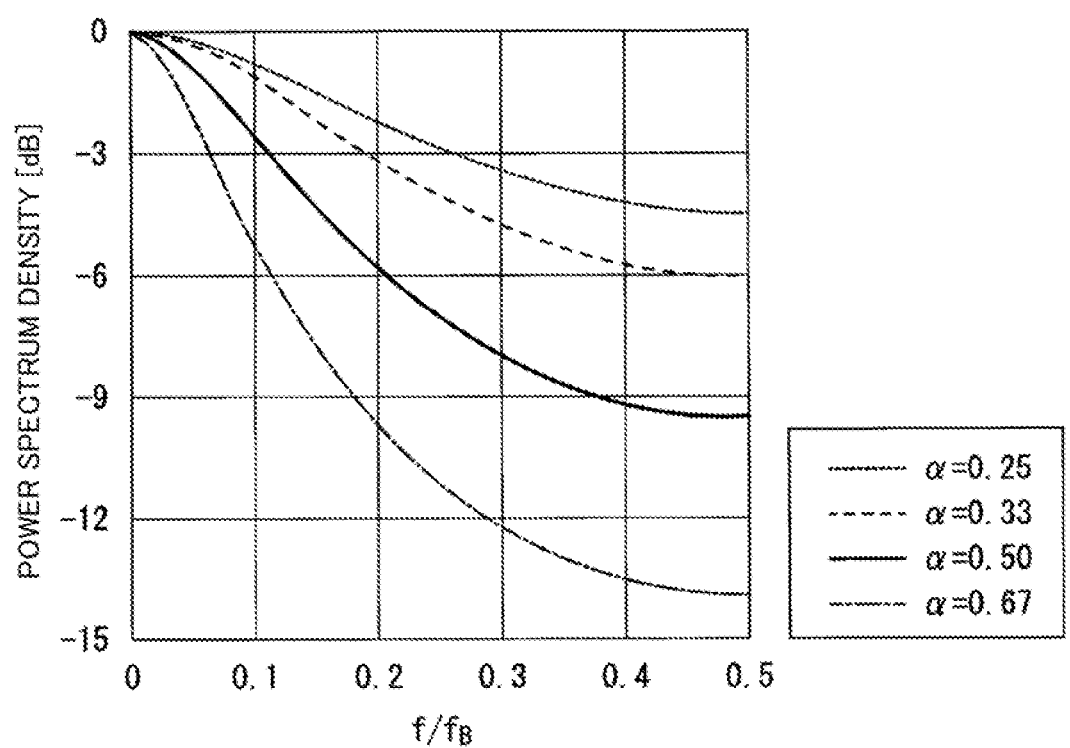
FIG. 3 is a graph showing changes in power spectrum density in the first embodiment.

In Equation (11), $f_B$ is the modulation frequency of the signal. FIG. 3 is a graph showing the spectral shape of the power spectrum density S(f) obtained when four types of values are applied to a in Equation (11). In the graph shown in FIG. 3, the vertical axis represents the power spectrum density S(f), in units of [dB]. The horizontal axis represents $f/f_B$, which is included in Equation (11).

Note that in FIG. 3, the spectral shape for $\alpha$=0.5 is similar to a spectral shape obtained when nonlinear trellis coding is used, as described in NPL 1. As can be seen from FIG. 3, for all instances of $\alpha$, high-frequency components of the signal power spectrum are suppressed and the signal power is concentrated in the low-frequency region. Therefore, by applying the nonlinear coding indicated in Equation (5) and Equation (6), the power spectrum of the signal can be narrowed.

In the first embodiment described this far, the optical transmission system 100 is provided with the optical transmitter 1 and the optical receiver 2, and in the optical transmitter 1, the signal generation unit 11 generates a series of m-valued transmission symbols $u_n$ from the transmission data. The signal coding unit 12 applies a predetermined coding method to each of the m-valued transmission symbols $u_n$ to generate symbols for transmission. The transmission unit 13 performs optical modulation on the basis of the symbols for transmission, generates signal light, and transmits the generated signal light. In the optical receiver 2, the reception unit 21 receives the signal light and generates a series of digital signals from the received signal light. The digital signal processing unit 22 applies predetermined digital signal processing to the series of digital signals to detect the coded symbols $v_n$, decodes m-valued transmission symbol from the detected coded symbols $v_n$, and restores the transmission data from the decoded m-valued transmission symbols.

The operations based on the above predetermined coding method is nonlinear coding, which generates m-valued intermediate symbols $\sim u_n$ from the m-valued transmission symbols $u_n$ to generate the coded symbols $v_n$. This operation is a nonlinear coding operation as indicated by Equation (5) and Equation (6), which assigns bit information to the state transitions between coded symbols adjacent in time series, increases the number of states that each of the coded symbols $v_n$ can take to be greater than the number of states of the m-valued transmission symbol $u_n$, and limits the transitions between series of coded symbols $v_n$ in time series. The signal coding unit 12 generates the coded symbols $v_n$ as symbols for transmission through the stated nonlinear coding operation. This makes it possible to narrow the signal spectrum without one symbol determination error for the coded signal inducing two or more symbol determination errors for the uncoded signal.

Note that the configuration of the signal coding unit 12 illustrated in FIG. 2 is an example illustrated as an equivalent circuit that realizes the nonlinear coding operation indicated by Equation (5) and Equation (6), but any configuration may be used as long as it is capable of implementing Equation (5) and Equation (6).

Other Example of Configuration of First Embodiment

In the configuration of the first embodiment described above, the signal coding unit 12 generates the coded symbols $v_n$ as symbols for transmission, but the following configuration is also possible.

The signal coding unit 12 generates a symbol after precoding, which is the output value of the remainder calculation unit 122 illustrated in FIG. 2, i.e., the intermediate symbol $\sim u_n$ calculated through Equation (6), as the symbol for transmission. The transmission unit 13 performs optical modulation on the basis of the intermediate symbol $\sim u_n$ output by the signal coding unit 12 to generate signal light. The transmission unit 13 outputs the generated signal light to the optical fiber transmission line 3. The optical fiber transmission line 3 transmits the signal light output by the transmission unit 13 to the optical receiver 2.

The digital signal processing unit 22 of the optical receiver 2 performs predetermined digital signal processing, including digital signal processing in which the operation of the above Equation (5) and waveform shaping processing are adaptively performed by a digital filter, on the digital signal series output by the reception unit 21, as well as threshold determination processing, to generate the coded symbol $v_n$. The digital signal processing unit 22 performs the operation indicated by the foregoing Equation (7) on the generated coded symbol $v_n$, i.e., an operation of dividing by m to calculate the remainder value, and decodes the m-valued transmission symbol.

Effects of Configuration of First Embodiment and Other Configuration

Conventionally, signal processing is used to transmit the m-valued transmission symbol $u_n$ from the transmitting side and restore the signal spectrum of the transmission symbol $u_n$ on the receiving side. In this case, signal quality deterioration caused by bandwidth limitations has occurred because noise is excessively amplified in the signal processing on the receiving side.

In contrast, in the configuration of the first embodiment, for the m-valued transmission symbol $u_n$ that is originally to be transmitted, the optical transmitter 1 generates the coded symbol $v_n$ by performing nonlinear coding as indicated by Equation (5) and Equation (6), and transmits the generated coded symbol $v_n$. The optical receiver 2 performs digital signal processing to restore the signal spectrum of the coded symbol $v_n$. The signal of the coded symbol $v_n$, which is the target of the digital signal processing in the optical receiver 2, is a narrow-band signal as described above, and thus the amplification of noise caused by the digital signal processing is low. Therefore, the configuration of the first embodiment can reduce deterioration in the signal quality compared to conventional configurations, which makes it possible to improve the bandwidth limitation tolerance.

In contrast, in the other example of the configuration of the first embodiment described above, the signal coding unit 12 generates the intermediate symbol ~$u_n$ calculated through Equation (6) as a symbol for transmission and transmits the generated intermediate symbol ~$u_n$. The digital signal processing unit 22 of the optical receiver 2 performs signal processing to restore the signal spectrum of the coded symbol $v_n$ as a restoration target, instead of using the signal spectrum of the intermediate symbol ~$u_n$ as the restoration target, by performing predetermined digital signal processing including the digital signal processing corresponding to the operation of Equation (5). In this case, the signal spectrum of the intermediate symbol ~$u_n$ is not narrowband, but the signal spectrum of the coded symbol $v_n$, which is the restoration target, is narrowband. Therefore, as with the configuration of the first embodiment, the amplification of noise associated with the digital signal processing is reduced in the other example of the configuration of the first embodiment as well. Accordingly, the other configuration of the first embodiment too can reduce deterioration in the signal quality compared to conventional configurations, which makes it possible to improve the bandwidth limitation tolerance. In the other example of the configuration of the first embodiment, the generation to the decoding of the coded symbol $v_n$ is performed in the digital signal processing unit 22 of the optical receiver 2, and it is therefore possible to narrow the signal spectrum without one symbol determination error for the signal after coding inducing two or more symbol determination error for the signal before coding as in the first embodiment.

Second Embodiment

Figure 4:
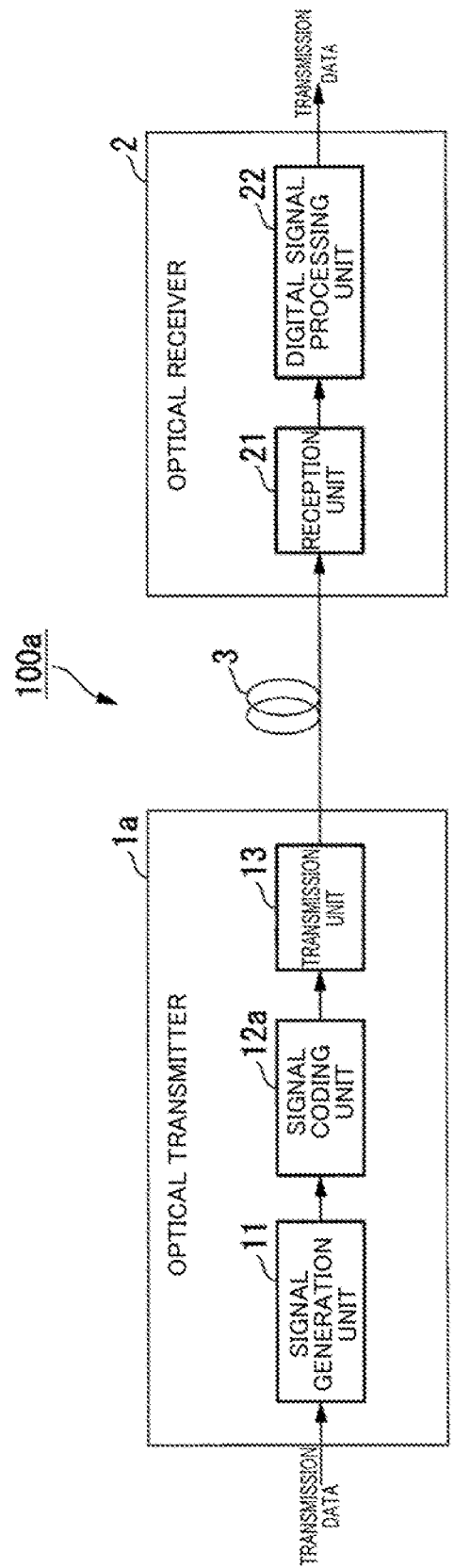
FIG. 4 is a block diagram illustrating the configuration of an optical transmission system according to a second embodiment.

FIG. 4 is a block diagram illustrating the configuration of an optical transmission system 100a according to a second embodiment. In the configuration of the second embodiment, the same reference signs are used for configurations that are the same as in the first embodiment, and only the different configurations will be described hereinafter. The optical transmission system 100a includes an optical transmitter 1a, the optical receiver 2, and the optical fiber transmission line 3 that connects the optical transmitter 1a and the optical receiver 2.

The optical transmitter 1a includes the signal generation unit 11, a signal coding unit 12a, and the transmission unit 13.

Figure 5:
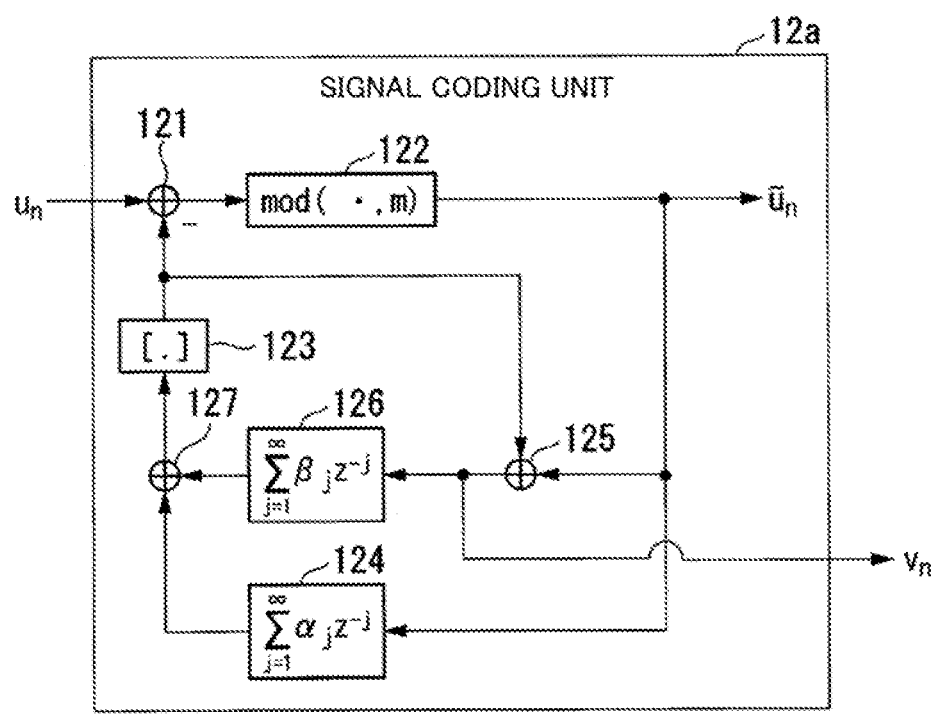
FIG. 5 is a block diagram illustrating the internal configuration of a signal coding unit according to the second embodiment.

FIG. 5 is a block diagram illustrating the internal configuration of the signal coding unit 12a. The signal coding unit 12a includes the subtractor 121, the remainder calculation unit 122, the Gaussian operation unit 123, the delay computation unit 124, the adder 125, a delay computation unit 126, and an adder 127.

The delay computation unit 126 performs the operation indicated in the following Equation (12), which calculates a sum by multiplying the coded symbol $v_n$ calculated in a past time slot by the adder 125 by a coefficient of "$\beta_j$" corresponding to each time slot.

[Math 12]

$$\Sigma_{j=1}^{\infty} \beta_j z^{-j} \tag{12}$$

Note that in Equation (12), "$\beta_j$" is any real number satisfying $0 \le \beta_j < 1$.

Unlike in the first embodiment, the delay computation unit 124 of the signal coding unit 12a takes in the intermediate symbol ~$u_n$ output by the remainder calculation unit 122 and performs the operation indicated in the above Equation (4), which calculates a sum by multiplying the taken-in code intermediate symbol ~$u_n$ by the coefficient of "$\alpha_j$" corresponding to each time slot.

The adder 127 adds the output value of the delay computation unit 124 and the output value of the delay computation unit 126. The adder 127 outputs the added value obtained by the addition to the Gaussian operation unit 123. The Gaussian operation unit 123 performs a Gaussian operation on the added values output by the adder 127. The Gaussian operation unit 123 outputs the integer value obtained by the Gaussian operation to the subtractor 121.

The coded symbol $v_n$, which is calculated by the adder 125, is expressed as the following Equation (13).

[Math 13]

$$v_n = \tilde{u}_n + [\Sigma_{j=1}^{\infty} \alpha_j \tilde{u}_{n-j} + \Sigma_{j=1}^{\infty} \beta_j v_{n-j}] \tag{13}$$

The intermediate symbol ~$u_n$ calculated by the remainder calculation unit 122 is expressed as the following Equation (14).

[Math 14]

$$\tilde{u}_n = \mathrm{mod}\,(u_n - [\Sigma_{j=1}^{\infty} \alpha_j \tilde{u}_{n-j} + \Sigma_{j=1}^{\infty} \beta_j v_{n-j}], m) \tag{14}$$

As can be seen from Equation (14), the intermediate symbol ~$u_n$ is an m-valued symbol, and is ~$u_n \in \{0, 1, 2, \ldots, m-1\}$. Equation (13) and Equation (14) can be summarized as the following Equation (15).

[Math 15]

$$v_n = \begin{cases} u_n & \left(u_n \ge \left[\Sigma_{j=1}^{\infty} \alpha_j \tilde{u}_{n-j} + \Sigma_{j=1}^{\infty} \beta_j v_{n-j}\right]\right) \\ u_n + m & \left(u_n < \left[\Sigma_{j=1}^{\infty} \alpha_j \tilde{u}_{n-j} + \Sigma_{j=1}^{\infty} \beta_j v_{n-j}\right]\right) \end{cases} \tag{15}$$

As can be seen from Equation (15), the transmission symbol $u_n$ can be decoded by dividing the coded symbol $v_n$ by m to calculate the remainder value. Therefore, as in the first embodiment, in the second embodiment as well, the digital signal processing unit 22 of the optical receiver 2 can decode the transmission symbol $u_n$ using the above Equation (7).

In the second embodiment described this far, the optical transmission system 100a is provided with the optical transmitter 1a and the optical receiver 2, and in the optical transmitter 1a, the signal generation unit 11 generates a series of m-valued transmission symbols $u_n$ on the basis of the transmission data. The signal coding unit 12a applies a predetermined coding method to each of the m-valued transmission symbols $u_n$ to generate symbols for transmission. The transmission unit 13 performs optical modulation on the basis of the symbols for transmission, generates signal light, and transmits the generated signal light. In the optical receiver 2, the reception unit 21 receives the signal light and generates a series of digital signals from the received signal light. The digital signal processing unit 22 applies predetermined digital signal processing to the series of digital signals to detect the coded symbols $v_n$, decodes m-valued transmission symbol from the detected coded symbols $v_n$, and restores the transmission data from the decoded m-valued transmission symbols.

In the configuration of the second embodiment described above, the operations based on the predetermined coding method performed by the signal coding unit 12a is nonlinear coding, which generates m-valued intermediate symbols $\sim u_n$ from the m-valued transmission symbols $u_n$ to generate the coded symbols $v_n$. This operation is a nonlinear coding operation as indicated by Equation (13) and Equation (14), which assigns bit information to the state transitions between coded symbols adjacent in time series, increases the number of states that each of the coded symbols $v_n$ can take to be greater than the number of states of the m-valued transmission symbol $u_n$, and limits the transitions between series of coded symbols $v_n$ in time series. The signal coding unit 12a generates the coded symbols $v_n$ as symbols for transmission through the stated nonlinear coding operation.

The operation of the above Equation (5) performed by the signal coding unit 12 of the first embodiment is processing corresponding to feedback processing in the technical field of control circuits, and has an IIR (Infinite Impulse Response) filter structure. In contrast, the operation of the above Equation (13) performed by the signal coding unit 12a of the second embodiment is processing corresponding to feed-forward processing, and has an FIR (Finite Impulse Response) filter structure. Therefore, the signal coding unit 12a of the second embodiment can be said to have a configuration in which an FIR filter structure is added to the signal coding unit 12 of the first embodiment. A generalized control circuit includes both IIR and FIR, and from that perspective, the signal coding unit 12a can be said to be more generalized than the signal coding unit 12. The $\alpha_j$ and $\beta_j$ in Equation (13) above are parameters that affect the spectral shape of the coded symbol $v_n$, and comparing Equation (13) with Equation (5), Equation (13) can realize a more complex spectral shape due to the addition of a term that includes $\beta_j$. Accordingly, like the configuration of the first embodiment, the configuration of the second embodiment can narrow the signal spectrum without one symbol determination error for the coded signal inducing two or more symbol determination errors for the uncoded signal.

Note that like the other example of the configuration of the first embodiment, in the above second embodiment, the signal coding unit 12a may output the intermediate symbol $\sim u_n$ calculated through Equation (14) to the transmission unit 13. In this case, the digital signal processing unit 22 of the optical receiver 2 performs predetermined digital signal processing, including digital signal processing in which the operation of the above Equation (13) and waveform shaping processing are adaptively performed by a digital filter, as well as threshold determination processing, to generate the coded symbol $v_n$.

Additionally, the configuration of the signal coding unit 12a illustrated in FIG. 5 is an example illustrated as an equivalent circuit that realizes the operations indicated by Equation (13) and Equation (14), but any configuration may be used as long as it is capable of implementing Equation (13) and Equation (14).

Additionally, in the above 1stst embodiment, the other example of the configuration of the first embodiment, and the second embodiment, the digital signal processing unit 22 may perform decoding using MLSE instead of the decoding performed through Equation (7).

Third Embodiment

Figure 6:
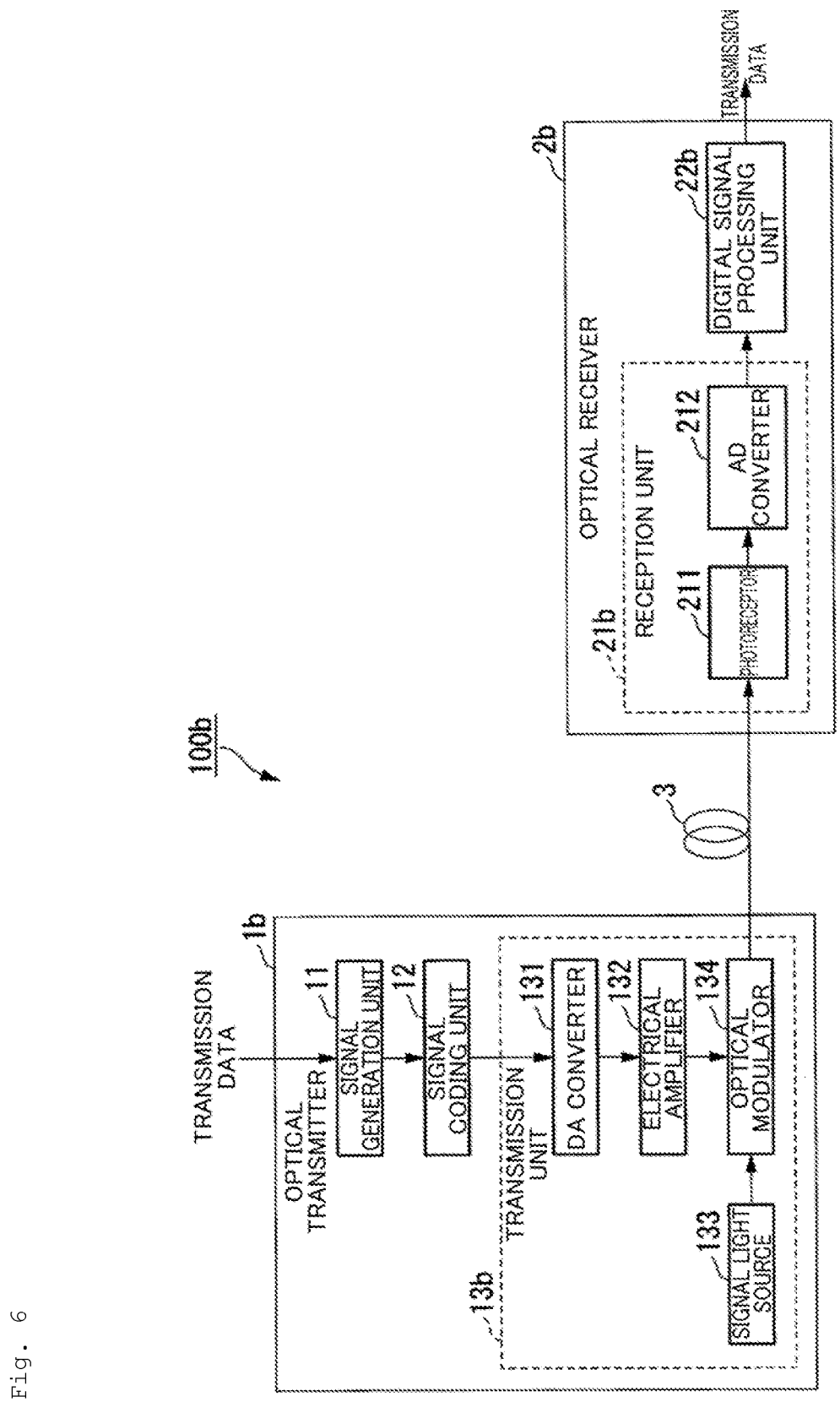
FIG. 6 is a block diagram illustrating the configuration of an optical transmission system according to a third embodiment.

FIG. 6 is a block diagram illustrating the configuration of an optical transmission system 100b according to a third embodiment. The optical transmission system 100b has a more specific configuration for the optical transmission system 100 of the first embodiment. In the configuration of the third embodiment, the same reference signs are used for configurations that are the same as in the first and second embodiments, and only the different configurations will be described hereinafter.

The optical transmission system 100b includes an optical transmitter 1b, an optical receiver 2b, and the optical fiber transmission line 3 that connects the optical transmitter 1b and the optical receiver 2b.

The optical transmitter 1b includes the signal generation unit 11, the signal coding unit 12, and a transmission unit 13b. The transmission unit 13b is equipped with a DA (Digital to Analog) converter 131, an electrical amplifier 132, a signal light source 133, and an optical modulator 134. The DA converter 131 sequentially takes in the coded symbols $v_n$ output by the signal coding unit 12, converts the taken-in series of coded symbols $v_n$ into an analog signal, and outputs the analog signal. The electrical amplifier 132 amplifies the signal power of the analog signal output by the DA converter 131 and outputs the amplified signal.

The signal light source 133 outputs continuous light to the optical modulator 134. The optical modulator 134 strength-modulates the continuous light output by the signal light source 133 on the basis of the analog signal whose signal power is amplified by the electrical amplifier 132, and generates signal light of an optical strength modulation signal. The optical modulator 134 outputs the generated signal light to the optical fiber transmission line 3.

The optical receiver 2b includes a reception unit 21b and a digital signal processing unit 22b. The reception unit 21b includes a photoreceptor 211 and an AD (Analog to Digital) converter 212. The photoreceptor 211 receives the signal light to be transmitted by the optical fiber transmission line 3. The photoreceptor 211 converts optical intensity information of the signal light into an analog electrical signal by direct detection and outputs the analog signal. The AD converter 212 converts the analog electrical signal output by the photoreceptor 211 into a digital signal and outputs the digital signal.

Figure 7:
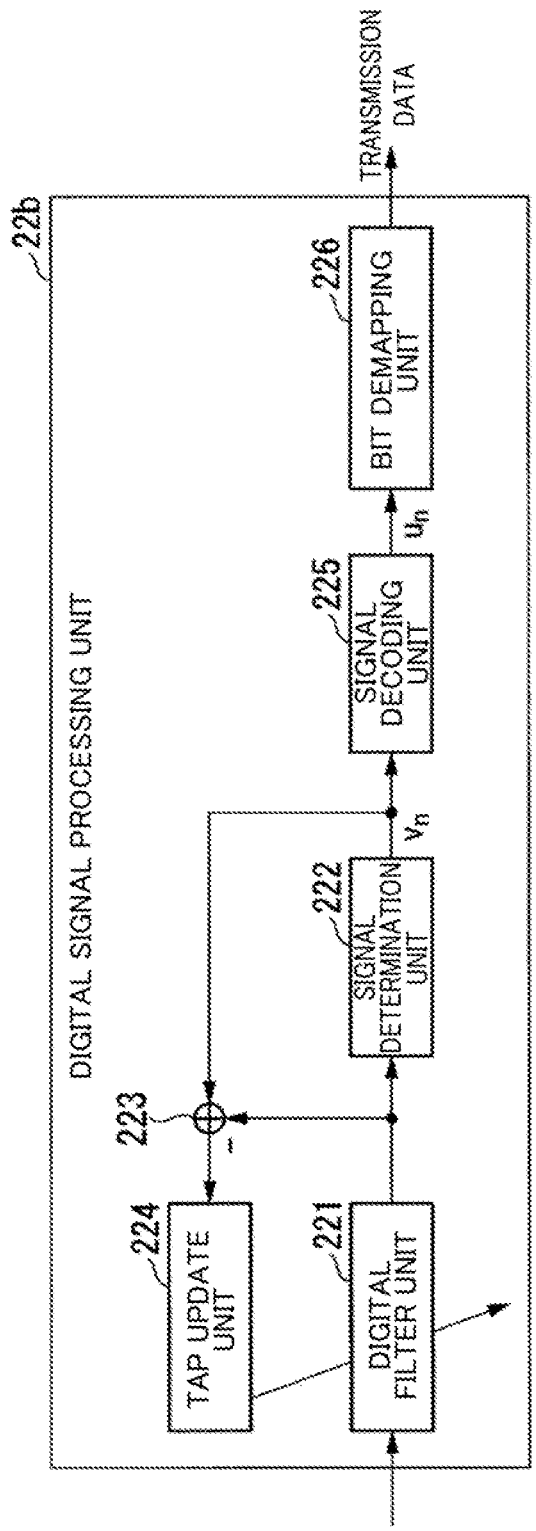
FIG. 7 is a block diagram illustrating the internal configuration of a digital signal processing unit according to the third embodiment.

FIG. 7 is a block diagram illustrating the internal configuration of the digital signal processing unit 22b. The digital signal processing unit 22b includes a digital filter unit 221, a signal determination unit 222, a subtractor 223, a tap update unit 224, a signal decoding unit 225, and a bit demapping unit 226.

The digital filter unit 221 performs predetermined digital signal processing, e.g., waveform shaping filtering processing, with tap coefficients provided by the tap update unit 224. The digital filter applied to the digital filter unit 221 may be, for example, an FIR filter, which is a general linear filter, or a Volterra filter, in which higher-order transfer functions can be denoted.

The signal determination unit 222 detects the coded symbol $v_n$ by performing threshold determination processing. The subtractor 223 subtracts the output value of the digital filter unit 221 from the output value of the signal determination unit 222, i.e., the coded symbol $v_n$, and outputs the subtraction value obtained by the subtraction to the tap update unit 224.

The subtraction value output by the subtractor 223 represents a difference between the value after the signal determination unit 222 makes the threshold determination and the value before the threshold determination. Reducing this difference makes it possible to improve the accuracy of demodulation. The tap update unit 224 updates the tap coefficients so that this difference is minimized, and outputs the updated tap coefficients to the digital filter unit 221.

The signal decoding unit 225 decodes the m-valued transmission symbol $u_n$ by performing the operation indicated in Equation (7) above, i.e., dividing the coded symbol $v_n$ by m to obtain the remainder value. The bit demapping unit 226 demaps, i.e., Gray-decodes, the decoded m-valued transmission symbol $u_n$ to restore the bit data of the transmission data.

Processing According to Third Embodiment

Figure 8:
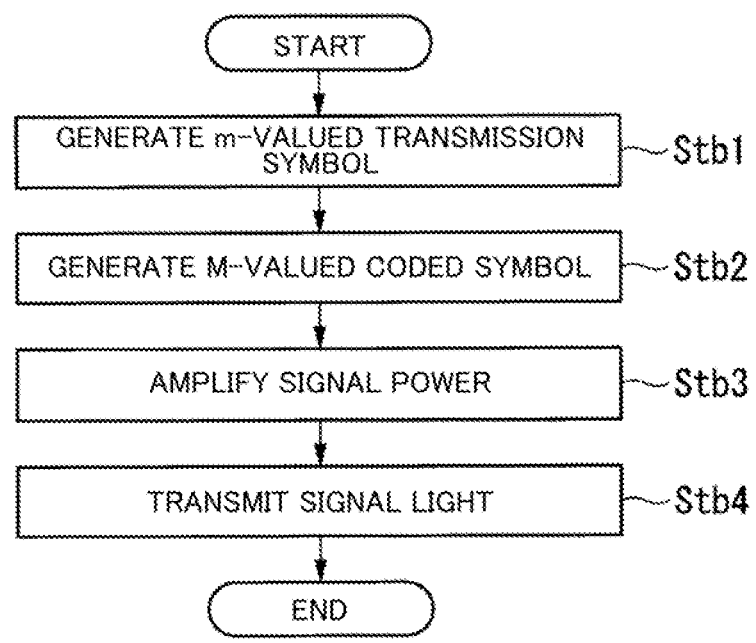
FIG. 8 is a flowchart illustrating the flow of processing by an optical transmitter according to the third embodiment.
Figure 9:
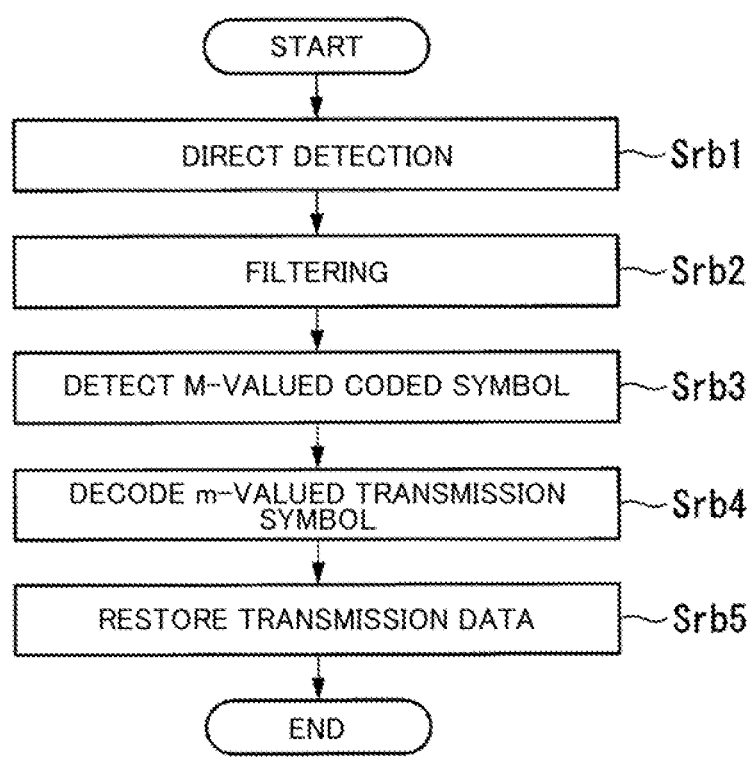
FIG. 9 is a flowchart illustrating the flow of processing by an optical receiver according to the third embodiment.

Processing performed by the optical transmission system 100b of the third embodiment will be described next. FIG. 8 is a flowchart illustrating the flow of processing by the optical transmitter 1b, and FIG. 9 is a flowchart illustrating the flow of processing by the optical receiver 2b.

The following will describe an example where three different combinations of parameters are applied. Here, the three parameter combinations are "m=4, $\alpha_1=\frac{1}{2}$, $\alpha_j=0$ (j=2, 3, ...)", "m=4, $\alpha_1=\frac{2}{3}$, $\alpha_j=0$ (j=2, 3, ...)", and "m=8, $\alpha_1=\frac{1}{2}$, $\alpha_j=0$ (j=2, 3, ...)".

Combination 1: m=4, $\alpha_1=\frac{1}{2}$, $\alpha_j=0$ (j=2, 3, ...)

The processing by the optical transmitter 1b in the case of "Combination 1" will be described according to the flowchart illustrated in FIG. 8. The signal generation unit 11 takes in the transmission data and generates the four-valued transmission symbols $u_n$ (0, 1, 2, 3), which are Gray coded, from the taken-in transmission data (step Stb1). The signal coding unit 12 performs nonlinear coding as indicated by Equation (5) and Equation (6) above. When m=4 and $\alpha_1=\frac{1}{2}$, M=6, and thus the signal coding unit 12 generates six-valued coded symbols $v_n$ (0, 1, 2, 3, 4, 5) through the nonlinear coding (Step Stb2).

The DA converter 131 converts a digital signal, which is the series of six-valued coded symbols $v_n$, into an analog signal and outputs the analog signal. The electrical amplifier 132 amplifies the signal power of the analog signal output by the DA converter 131 and outputs the amplified signal to the optical modulator 134 (step Stb3).

The optical modulator 134 modulates the optical intensity of the continuous light output by the signal light source 133 on the basis of the analog signal output by the electrical amplifier 132. The six-valued optical strength modulation signal that the optical modulator 134 generates by optical intensity modulation is the NLTCP6 (Nonliner trellis coded PAM6) signal. The optical modulator 134 transmits the NLTCP6 signal light generated by optical intensity modulation to the optical receiver 2b through the optical fiber transmission line 3 (Step Stb4).

A transition probability matrix P of the six-valued coded symbol $v_n$ after coding by the signal coding unit 12 is represented by the following Equation (16).

[Math 16]

$$P = \begin{pmatrix} 1/4 & 1/4 & 0 & 0 & 0 & 0 \\ 1/4 & 1/4 & 1/4 & 1/4 & 0 & 0 \\ 1/4 & 1/4 & 1/4 & 1/4 & 1/4 & 1/4 \\ 1/4 & 1/4 & 1/4 & 1/4 & 1/4 & 1/4 \\ 0 & 0 & 1/4 & 1/4 & 1/4 & 1/4 \\ 0 & 0 & 0 & 0 & 1/4 & 1/4 \end{pmatrix} \quad (16)$$

As can be seen from Equation (16), the nonlinear coding by the signal coding unit 12, indicated by Equation (5) and Equation (6), partially restricts the transition of the coded symbol $v_n$ after coding. For example, as indicated in the first column of the transition probability matrix P, the only symbol values that can transition from a symbol value of "0" are "0, 1, 2, 3", and transitions to symbol values "4, 5" are restricted. In other words, the nonlinear coding indicated in Equation (5) and Equation (6) suppresses the occurrence of high-frequency symbol transitions by imposing restrictions on the symbol transitions, which makes it possible to realize a narrower signal spectrum.

An eigenvector q for an eigenvalue 1 of the transition probability matrix P in Equation (16) is represented by Equation (17).

[Math 17]

$$q = \begin{pmatrix} 1/16 \\ 3/16 \\ 4/16 \\ 4/16 \\ 3/16 \\ 1/16 \end{pmatrix} \quad (17)$$

As can be seen from Equation (17), the occurrence probabilities of the states, i.e., the occurrence probabilities of the symbols, are not equal probabilities, with symbols closer to the center having greater probabilities of occurring. This means that the nonlinear coding indicated by Equation (5) and Equation (6), which is performed by the signal coding unit 12, is processing that prevents the occurrence probabilities of the symbols from being unequal, i.e., ensures equal probabilities as in conventional techniques, and is processing equivalent to probabilistic shaping.

The processing by the optical receiver 2b in the case of "Combination 1" will be described next, according to the flowchart illustrated in FIG. 9. The photoreceptor 211 of the reception unit 21b receives the signal light transmitted by the optical fiber transmission line 3, converts the optical intensity information of the NLTCP6 signal into an analog electrical signal by directly detecting the received signal light, and outputs the analog signal (Step Srb1).

The AD converter 212 converts the analog electrical signal output by the photoreceptor 211 into a digital signal and outputs the digital signal. The digital filter unit 221 performs filtering processing on the digital signal output by the AD converter 212 on the basis of the tap coefficients provided by the tap update unit 224, and outputs the filtered digital signal to the signal determination unit 222 and the subtractor 223 (Step Srb2).

The signal determination unit 222 performs the threshold determination processing on the filtered digital signal output by the digital filter unit 221 to detect the six-valued coded symbols $v_n$ (Step Srb3). The signal determination unit 222 outputs the detected six-valued coded symbols $v_n$ to the signal decoding unit 225 and the subtractor 223.

The signal decoding unit 225 performs the operations indicated by Equation (7) above, assuming m=4. In other words, the signal decoding unit 225 decodes the four-valued transmission symbol $u_n$ by performing an operation of dividing the six-valued coded symbol $v_n$ by 4 to obtain the remainder value (step Srb4). The bit demapping unit 226 performs bit demapping, i.e., Gray-decoding, on the decoded four-valued transmission symbol $u_n$ to restore the bit data of the transmission data (step Srb5).

In parallel with the above-described processing, the subtractor 223 subtracts the output value of the digital filter unit 221 from the output value of the signal determination unit 222, i.e., the coded symbol $v_n$, and outputs the subtraction value obtained by the subtraction to the tap update unit 224. The tap update unit 224 calculates new tap coefficients so as to minimize the subtraction value output by the subtractor 223, and outputs the calculated tap coefficients to the digital filter unit 221.

Figure 10:
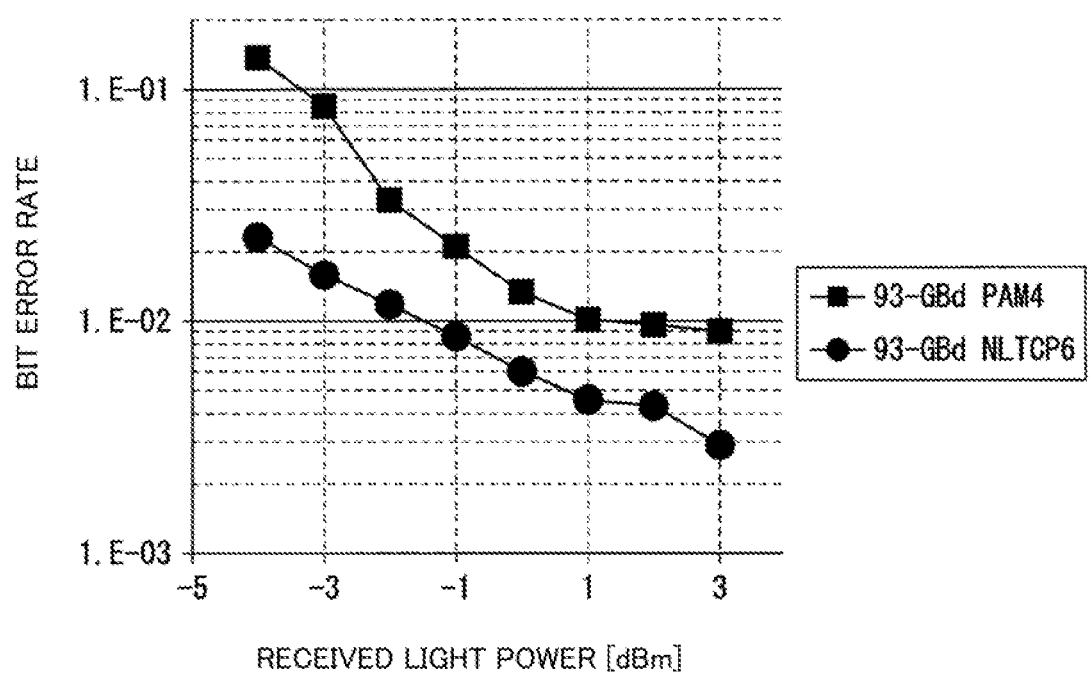
FIG. 10 is a graph showing transmission characteristics of an NLTCP6 signal generated in the third embodiment and transmission characteristics of a conventional PAM4 signal.

FIG. 10 is a graph showing the transmission characteristics of a conventional PAM4 signal and the NLTCP6 signal described above in a bandwidth-limited environment as evaluated by an optical transmission experiment. The vertical axis represents the bit error rate (BER), and the horizontal axis represents the received optical power. The unit of the received optical power is [dBm]. The modulation rate of both the PAM4 signal and the NLTCP6 signal is 93 Gbaud, and the transmission capacity is 186 Gb/s. As indicated in FIG. 10, for PAM4 signals, even when the received optical power is sufficiently high, waveform deterioration caused by the bandwidth limitation will limit the transmission performance. Therefore, a bit error rate of only approximately $9 \times 10^{-3}$ can be achieved.

In contrast, the NLTCP6 signal can achieve a bit error rate of approximately $3 \times 10^{-3}$ by increasing the received optical power to a sufficient extent. This means that the NLTCP6 signal has high bandwidth limitation tolerance, which indicates that the nonlinear coding indicated by Equation (5) and Equation (6) above provides improved bandwidth limitation tolerance.

Combination 2: m=4, $\alpha_1 = 2/3$, $\alpha_j = 0$ (j=2, 3, . . . )

The processing by the optical transmitter 1b in the case of "Combination 2" will be described according to the flowchart illustrated in FIG. 8. The signal generation unit 11 takes in the transmission data and generates the four-valued transmission symbols $u_n$ (0, 1, 2, 3), which are Gray coded, from the taken-in transmission data (step Stb1). The signal coding unit 12 performs nonlinear coding as indicated by Equation (5) and Equation (6) above. When m=4 and $\alpha_1 = 2/3$, M=8, and thus the signal coding unit 12 generates eight-valued coded symbols $v_n$ (0, 1, 2, 3, 4, 5, 6, 7) through the nonlinear coding (Step Stb2).

The DA converter 131 of the transmission unit 13b converts a digital signal, which is the series of eight-valued coded symbols $v_n$, into an analog signal. The electrical amplifier 132 amplifies the signal power of the analog signal output by the DA converter 131 and outputs the amplified signal to the optical modulator 134 (step Stb3).

The optical modulator 134 modulates the optical intensity of the continuous light output by the signal light source 133 on the basis of the analog signal output by the electrical amplifier 132. The eight-valued optical strength modulation signal that the optical modulator 134 generates by optical intensity modulation is an NLTCP8 (Nonliner trellis coded PAM8) signal. The optical modulator 134 transmits the NLTCP8 signal light generated by optical intensity modulation to the optical receiver 2b through the optical fiber transmission line 3 (Step Stb4).

A transition probability matrix P of the eight-valued coded symbol $v_n$ after coding by the signal coding unit 12 is represented by the following Equation (18).

[Math 18]

$$P = \begin{pmatrix} 1/4 & 1/4 & 0 & 0 & 0 & 0 & 0 & 0 \\ 1/4 & 1/4 & 1/4 & 0 & 0 & 0 & 0 & 0 \\ 1/4 & 1/4 & 1/4 & 1/4 & 1/4 & 0 & 0 & 0 \\ 1/4 & 1/4 & 1/4 & 1/4 & 1/4 & 1/4 & 0 & 0 \\ 0 & 0 & 1/4 & 1/4 & 1/4 & 1/4 & 1/4 & 1/4 \\ 0 & 0 & 0 & 1/4 & 1/4 & 1/4 & 1/4 & 1/4 \\ 0 & 0 & 0 & 0 & 0 & 1/4 & 1/4 & 1/4 \\ 0 & 0 & 0 & 0 & 0 & 0 & 1/4 & 1/4 \end{pmatrix} \quad (18)$$

As can be seen from Equation (18), the nonlinear coding by the signal coding unit 12, indicated by Equation (5) and Equation (6), partially restricts the transition of the coded symbol $v_n$ after coding. For example, as indicated in the first column of the transition probability matrix P, the only symbol values that can transition from a symbol value of "0" are "0, 1, 2, 3", and transitions to symbol values "4, 5, 6, 7" are restricted. In other words, the nonlinear coding indicated in Equation (5) and Equation (6) suppresses the occurrence of high-frequency symbol transitions by imposing restrictions on the symbol transitions, which makes it possible to realize a narrower signal spectrum.

An eigenvector q for an eigenvalue 1 of the transition probability matrix P in Equation (18) is represented by Equation (19).

[Math 19]

$$q = \begin{pmatrix} 1/44 \\ 3/44 \\ 8/44 \\ 10/44 \\ 10/44 \\ 8/44 \\ 3/44 \\ 1/44 \end{pmatrix} \quad (19)$$

As can be seen from Equation (19), the occurrence probabilities of the states, i.e., the occurrence probabilities of the symbols, are not equal probabilities, with symbols closer to the center having greater probabilities of occurring. This means that the nonlinear coding indicated by Equation (5) and Equation (6), which is performed by the signal coding unit 12, is processing that prevents the occurrence probabilities of the symbols from being unequal, i.e., ensures equal probabilities as in conventional techniques, and is processing equivalent to probabilistic shaping.

The processing by the optical receiver 2b in the case of "Combination 2" will be described next, according to the flowchart illustrated in FIG. 9. The photoreceptor 211 of the reception unit 21b receives the signal light transmitted by the optical fiber transmission line 3, converts the optical intensity information of the NLTCP8 signal into an analog electrical signal by directly detecting the received signal light, and outputs the analog signal (Step Srb1).

Step Srb2 is the same processing as in the case of "Combination 1". The signal determination unit 222 performs the threshold determination processing on the filtered digital signal output by the digital filter unit 221 to detect the eight-valued coded symbols $v_n$ (Step Srb3). The signal determination unit 222 outputs the detected eight-valued coded symbols $v_n$ to the signal decoding unit 225 and the subtractor 223.

Step Srb4 and step Srb5 are the same processing as in the case of "Combination 1". Note that in the processing of the optical receiver 2*b* in the case of "Combination 2", the processing of the subtractor 223 and the tap update unit 224 is the same processing as in the case of "Combination 1".

Combination 3: m=8, $\alpha_1$=½, $\alpha_j$=0 (j=2, 3, . . . )

The processing by the optical transmitter 1*b* in the case of "Combination 3" will be described according to the flowchart illustrated in FIG. 8. The signal generation unit 11 takes in the transmission data and generates the eight-valued transmission symbols $u_n$ (0, 1, 2, 3, 4, 5, 6, 7), which are Gray coded, from the taken-in transmission data (step Stb1). The signal coding unit 12 performs nonlinear coding as indicated by Equation (5) and Equation (6) above. When m=8 and $\alpha_1$=½, M=14, and thus the signal coding unit 12 generates 14-valued coded symbols $v_n$ (0, 1, 2, 3, 4, 5, 6, 7, 8, 9, 10, 11, 12, 13) through the nonlinear coding (Step Stb2).

The DA converter 131 of the transmission unit 13*b* converts a digital signal, which is the series of 14-valued coded symbols $v_n$, into an analog signal. The electrical amplifier 132 amplifies the signal power of the analog signal output by the DA converter 131 and outputs the amplified signal to the optical modulator 134 (step Stb3).

The optical modulator 134 modulates the optical intensity of the continuous light output by the signal light source 133 on the basis of the analog signal output by the electrical amplifier 132. The 14-valued optical strength modulation signal that the optical modulator 134 generates through optical intensity modulation is an NLTCP14 (Nonliner trellis coded PAM14) signal. The optical modulator 134 transmits the NLTCP14 signal light generated by optical intensity modulation to the optical receiver 2*b* through the optical fiber transmission line 3 (Step Stb4).

A transition probability matrix P of the 14-valued coded symbol $v_n$ after coding by the signal coding unit 12 is represented by the following Equation (20).

[Math 20]

$$P = \begin{pmatrix} 1/8 & 1/8 & 0 & 0 & 0 & 0 & 0 & 0 & 0 & 0 & 0 & 0 & 0 & 0 \\ 1/8 & 1/8 & 1/8 & 1/8 & 0 & 0 & 0 & 0 & 0 & 0 & 0 & 0 & 0 & 0 \\ 1/8 & 1/8 & 1/8 & 1/8 & 1/8 & 1/8 & 0 & 0 & 0 & 0 & 0 & 0 & 0 & 0 \\ 1/8 & 1/8 & 1/8 & 1/8 & 1/8 & 1/8 & 1/8 & 1/8 & 0 & 0 & 0 & 0 & 0 & 0 \\ 1/8 & 1/8 & 1/8 & 1/8 & 1/8 & 1/8 & 1/8 & 1/8 & 1/8 & 1/8 & 0 & 0 & 0 & 0 \\ 1/8 & 1/8 & 1/8 & 1/8 & 1/8 & 1/8 & 1/8 & 1/8 & 1/8 & 1/8 & 1/8 & 1/8 & 0 & 0 \\ 1/8 & 1/8 & 1/8 & 1/8 & 1/8 & 1/8 & 1/8 & 1/8 & 1/8 & 1/8 & 1/8 & 1/8 & 1/8 & 1/8 \\ 1/8 & 1/8 & 1/8 & 1/8 & 1/8 & 1/8 & 1/8 & 1/8 & 1/8 & 1/8 & 1/8 & 1/8 & 1/8 & 1/8 \\ 0 & 0 & 1/8 & 1/8 & 1/8 & 1/8 & 1/8 & 1/8 & 1/8 & 1/8 & 1/8 & 1/8 & 1/8 & 1/8 \\ 0 & 0 & 0 & 0 & 1/8 & 1/8 & 1/8 & 1/8 & 1/8 & 1/8 & 1/8 & 1/8 & 1/8 & 1/8 \\ 0 & 0 & 0 & 0 & 0 & 0 & 1/8 & 1/8 & 1/8 & 1/8 & 1/8 & 1/8 & 1/8 & 1/8 \\ 0 & 0 & 0 & 0 & 0 & 0 & 0 & 0 & 1/8 & 1/8 & 1/8 & 1/8 & 1/8 & 1/8 \\ 0 & 0 & 0 & 0 & 0 & 0 & 0 & 0 & 0 & 0 & 1/8 & 1/8 & 1/8 & 1/8 \\ 0 & 0 & 0 & 0 & 0 & 0 & 0 & 0 & 0 & 0 & 0 & 0 & 1/8 & 1/8 \end{pmatrix} \quad (20)$$

As can be seen from Equation (20), the nonlinear coding by the signal coding unit 12, indicated by Equation (5) and Equation (6), partially restricts the transition of the coded symbol $v_n$ after coding. For example, as indicated in the first column of the transition probability matrix P, the only symbol values that can transition from a symbol value of "0" are "0, 1, 2, 3, 4, 5, 6, 7", and transitions to symbol values "8, 9, 10, 11, 12, 13" are restricted. In other words, the nonlinear coding indicated in Equation (5) and Equation (6) suppresses the occurrence of high-frequency symbol transitions by imposing restrictions on the symbol transitions, which makes it possible to realize a narrower signal spectrum.

An eigenvector q for an eigenvalue 1 of the transition probability matrix P in Equation (20) is represented by Equation (21).

[Math 21]

$$q = \begin{pmatrix} 1/384 \\ 7/384 \\ 18/384 \\ 30/384 \\ 41/384 \\ 47/384 \\ 48/384 \\ 48/384 \\ 47/384 \\ 41/384 \\ 30/384 \\ 18/384 \\ 7/384 \\ 1/384 \end{pmatrix} \quad (21)$$

As can be seen from Equation (21), the occurrence probabilities of the states, i.e., the occurrence probabilities of the symbols, are not equal probabilities, with symbols closer to the center having greater probabilities of occurring. This means that the nonlinear coding indicated by Equation (5) and Equation (6), which is performed by the signal coding unit 12, is processing that prevents the occurrence probabilities of the symbols from being unequal, i.e., ensures equal probabilities as in conventional techniques, and is processing equivalent to probabilistic shaping.

The processing by the optical receiver 2*b* in the case of "Combination 3" will be described next, according to the flowchart illustrated in FIG. 9. The photoreceptor 211 of the reception unit 21*b* receives the signal light transmitted by the optical fiber transmission line 3, converts the optical intensity information of the NLTCP14 signal into an analog electrical signal by directly detecting the received signal light, and outputs the analog signal (Step Srb1).

Step Srb2 is the same processing as in the case of "Combination 1". The signal determination unit 222 performs the threshold determination processing on the filtered digital signal output by the digital filter unit 221 to detect the 14-valued coded symbols $v_n$ (Step Srb3). The signal determination unit 222 outputs the detected 14-valued coded symbols $v_n$ to the signal decoding unit 225 and the subtractor 223.

The signal decoding unit 225 performs the operations indicated by Equation (7) above, assuming m=8. In other words, the signal decoding unit 225 decodes the eight-valued transmission symbol $u_n$ by performing an operation of dividing the 14-valued coded symbol $v_n$ by 8 to obtain the remainder value (step Srb4). The bit demapping unit 226 performs bit demapping, i.e., Gray-decoding, on the decoded eight-valued transmission symbol $u_n$ to restore the bit data of the transmission data (step Srb5).

Note that in the processing of the optical receiver 2b in the case of "Combination 3", the processing of the subtractor 223 and the tap update unit 224 is the same processing as in the case of "Combination 1".

In the configuration of the third embodiment described above, in the optical transmitter 1b, the signal coding unit 12 generates M-valued coded symbols $v_n$ as symbols for transmission through a predetermined coding method that performs nonlinear coding represented by Equation (5) and Equation (6), using $\alpha_j$, which is a real number no less than 0 and no greater than 1 that is determined in advance so that M>m. The transmission unit 13b generates signal light by performing optical intensity modulation on the basis of the coded symbol $v_n$ generated by the signal coding unit 12, and transmits the generated signal light. In the optical receiver 2b, the reception unit 21b receives the signal light transmitted by the optical transmitter 1b, and directly detects the received signal light to generate a series of digital signals. The digital signal processing unit 22b detects the coded symbols $v_n$ by applying predetermined digital signal processing to the series of digital signals, decodes the m-valued transmission symbols $u_n$ by performing the operation of Equation (7), which calculates the remainder by dividing each of the detected coded symbols $v_n$ by m, and restores the transmission data from the decoded series of m-valued transmission symbols $u_n$. This makes it possible to narrow the signal spectrum without one symbol determination error for the coded signal inducing two or more symbol determination errors for the uncoded signal.

Note that the other example of the configuration of the first embodiment may be applied to the foregoing third embodiment. In this case, the signal coding unit 12 will generate the intermediate symbol $\sim u_n$ calculated through Equation (6) as the symbol for transmission. Because Equation (5) is performed through predetermined digital signal processing, the digital filter unit 221 performs the filtering processing by implementing the operation of Equation (5) and the waveform shaping processing in an adaptive manner using the tap coefficients.

Note that the configuration of the second embodiment may be applied to the foregoing third embodiment. In this case, the signal coding unit 12 performs nonlinear coding as indicated by Equation (13) and Equation (14). If the other example of the configuration of the first embodiment is applied along with the configuration of the second embodiment, the signal coding unit 12 generates the intermediate symbol $\sim u_n$ calculated through Equation (14) as the symbol for transmission. Because Equation (13) is performed through predetermined digital signal processing, the digital filter unit 221 performs the filtering processing by implementing the operation of Equation (13) and the waveform shaping processing in an adaptive manner using the tap coefficients.

Additionally, although the signal light source 133 and the optical modulator 134 are provided in the foregoing third embodiment, the optical modulator 134 may be omitted, the signal light source 133 may be directly modulated by adjusting the light intensity of a light source provided inside according to the amplitude of the analog electrical signal output by the electrical amplifier 132, and the modulated signal light may be output to the optical fiber transmission line 3.

Fourth Embodiment

Figure 11:
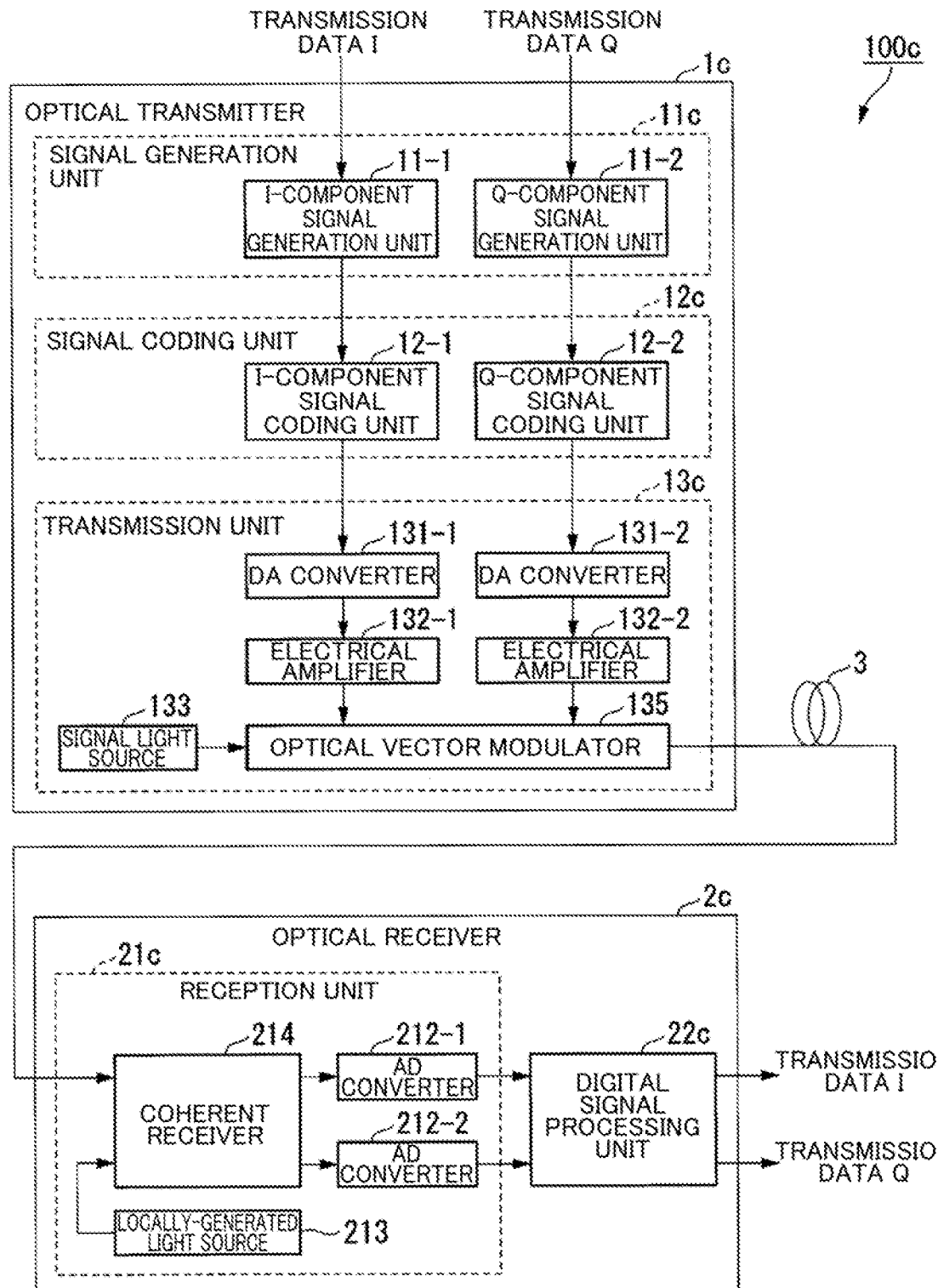
FIG. 11 is a block diagram illustrating the configuration of an optical transmission system according to a fourth embodiment.

FIG. 11 is a block diagram illustrating the configuration of an optical transmission system 100c according to a fourth embodiment. While the first through third embodiments described configurations in which PAM signals, which assume the direct detection method, are used for transmission, the fourth embodiment will describe a configuration in which QAM signals, which assume the coherent detection method, are used for transmission. In the configuration of the fourth embodiment, the same reference signs are used for configurations that are the same as in the first through third embodiments, and only the different configurations will be described hereinafter.

The optical transmission system 100c includes an optical transmitter 1c, an optical receiver 2c, and the optical fiber transmission line 3 that connects the optical transmitter 1c and the optical receiver 2c. The optical transmitter 1c includes a signal generation unit 11c, a signal coding unit 12c, and a transmission unit 13c.

The signal generation unit 11c includes an I (In-Phase) component signal generation unit 11-1 and a Q (Quadrature) component signal generation unit 11-2. The configurations of the I component signal generation unit 11-1 and the Q component signal generation unit 11-2 are the same as the configuration of the signal generation unit 11.

The signal coding unit 12c includes an I component signal coding unit 12-1 and a Q component signal coding unit 12-2. The configurations of the I component signal coding unit 12-1 and the Q component signal coding unit 12-2 are the same as the configuration of the signal coding unit 12. I-component and a Q-component coded symbols $v_n$ generated by the I component signal coding unit 12-1 and the Q component signal coding unit 12-2, respectively, will hereinafter be referred to as a coded symbol $vi_n$ and a coded symbol $vq_n$, respectively.

The transmission unit 13c includes DA converters 131-1 and 131-2, electrical amplifiers 132-1 and 132-2, the signal light source 133, and an optical vector modulator 135. Each of the DA converters 131-1 and 131-2 has the same configuration as the DA converter 131. Each of the electrical amplifiers 132-1 and 132-2 has the same configuration as the electrical amplifier 132.

The optical vector modulator 135 separates the continuous light output by the signal light source 133 into two, amplitude-modulates the separated continuous light independently on the basis of the series of coded symbols $vi_n$ output by the electrical amplifier 132-1 and the series of coded symbols $vi_n$ output by the electrical amplifier 132-2, and performs optical complex amplitude modulation to combine the resulting optical amplitude-modulated signals in an orthogonal manner.

In other words, the optical vector modulator 135 separates the continuous light output by the signal light source 133 into an I component and a Q component. The optical vector modulator 135 amplitude-modulates the separated I component continuous light on the basis of the series of coded symbols $vi_n$ output by the electrical amplifier 132-1 to generate an I component optical amplitude-modulated signal. Additionally, the optical vector modulator 135 amplitude-modulates the separated Q component continuous light on the basis of the series of coded symbols $vq_n$ output by the electrical amplifier 132-2 to generate a Q component optical amplitude-modulated signal. The optical vector modulator 135 generates the optical complex amplitude modulation signal by combining the I component optical amplitude-modulated signal and the Q component optical amplitude modulation signal so that a phase difference of $\pi/2$ is produced between those signals. The optical vector modulator 135 outputs the generated optical complex amplitude modulation signal to the optical fiber transmission line 3.

The optical receiver 2c includes a reception unit 21c and a digital signal processing unit 22c. The reception unit 21c includes a locally-oscillated light source (hereinafter referred to as a "locally-generated light source") 213, a coherent receiver 214, and AD converters 212-1 and 212-2.

The locally-generated light source 213 outputs the station emission used for coherent detection. The coherent receiver 214 receives the signal light transmitted by the optical fiber transmission line 3 and converts optical complex amplitude information of the signal light into two types of analog electrical signals by coherent detection using the locally-generated light output by the locally-generated light source 213. The AD converters 212-1 and 212-2 have the same configuration as the AD converter 212.

Figure 12:
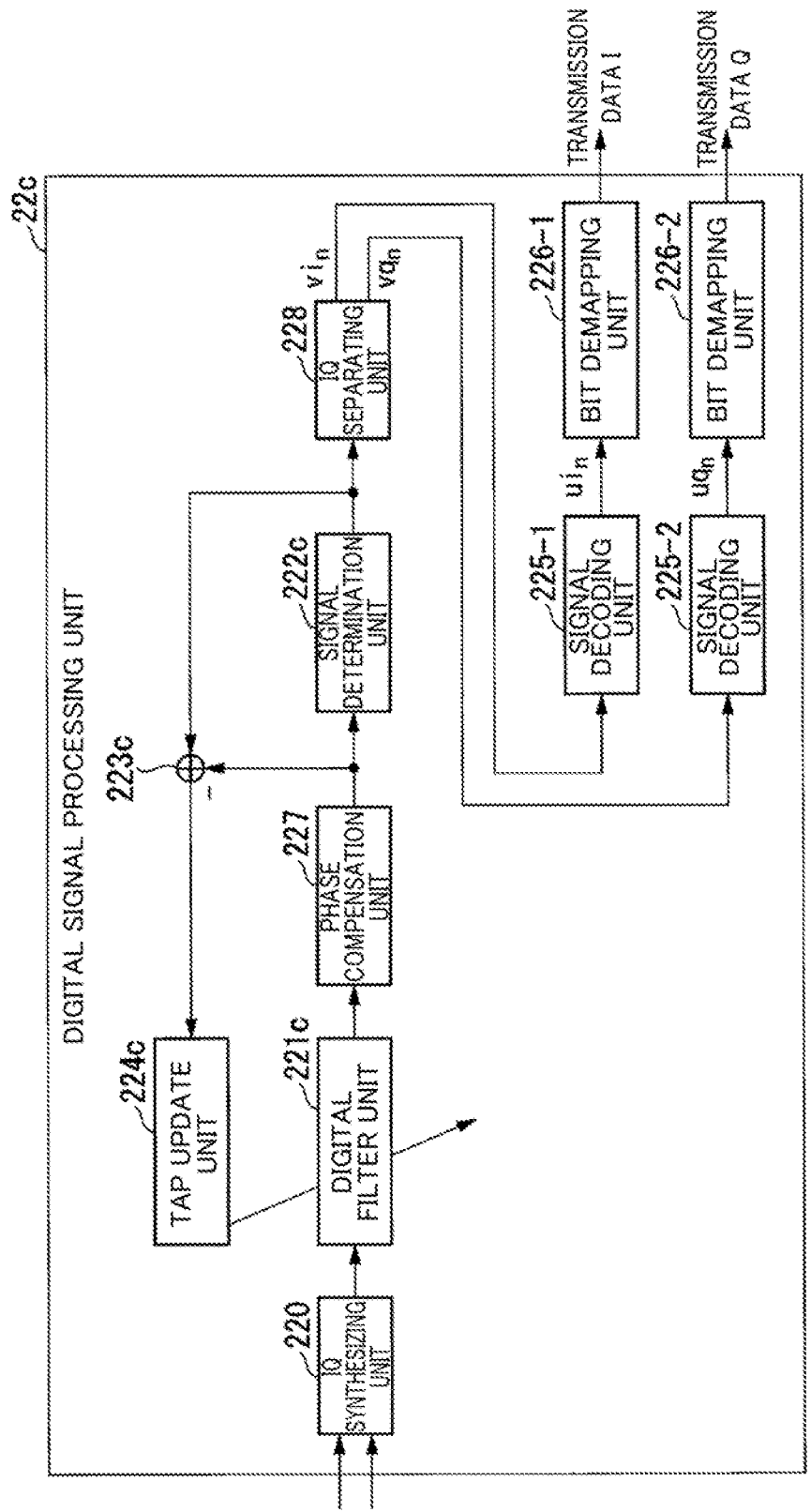
FIG. 12 is a block diagram illustrating the internal configuration of a digital signal processing unit according to the fourth embodiment.

FIG. 12 is a block diagram illustrating the internal configuration of the digital signal processing unit 22c. The digital signal processing unit 22c includes an IQ synthesizing unit 220, a digital filter unit 221c, a signal determination unit 222c, a subtractor 223c, a tap update unit 224c, a phase compensation unit 227, an IQ separating unit 228, signal decoding units 225-1 and 225-2, and bit demapping units 226-1 and 226-2.

The IQ synthesizing unit 220 synthesizes the digital signals output by the AD converters 212-1 and 212-2 as a complex digital signal. The digital filter unit 221c includes a complex-tap digital filter. The digital filter unit 221c performs predetermined digital signal processing, e.g., waveform shaping filtering processing, on the complex digital signal output by the IQ synthesizing unit 220, with tap coefficients provided by the tap update unit 224c. The digital filter applied to the digital filter unit 221c may be, for example, an FIR filter, which is a general linear filter, or a Volterra filter, in which higher-order transfer functions can be denoted.

The phase compensation unit 227 compensates for a phase difference between the signal light and the locally-generated light output by the locally-generated light source 213 for the complex digital signal after the filtering. The signal determination unit 222c performs threshold determination processing, and detects the coded symbol $vi_n$ and the coded symbol $vq_n$. The subtractor 223c subtracts the output value of the phase compensation unit 227 from the output value of the signal determination unit 222c, and outputs the subtraction value obtained by the subtraction to the tap update unit 224c.

The subtraction value output by the subtractor 223c represents a difference between the value after the signal determination unit 222c makes the threshold determination and the value before the threshold determination. Reducing this difference makes it possible to improve the accuracy of demodulation. The tap update unit 224c updates the tap coefficients so that this difference is minimized, and outputs the updated tap coefficients to the digital filter unit 221c.

The IQ separating unit 228 separates the coded symbol $vi_n$ and the coded symbol $vq_n$ output by the signal determination unit 222c by separating the real part and the imaginary part of the complex number, and outputs the separated symbols to the signal decoding units 225-1 and 225-2, respectively.

The signal decoding units 225-1 and 225-2 have the same configuration as the signal decoding unit 225. The bit demapping units 226-1 and 226-2 have the same configuration as the bit demapping unit 226.

Processing According to Fourth Embodiment

Figure 13:
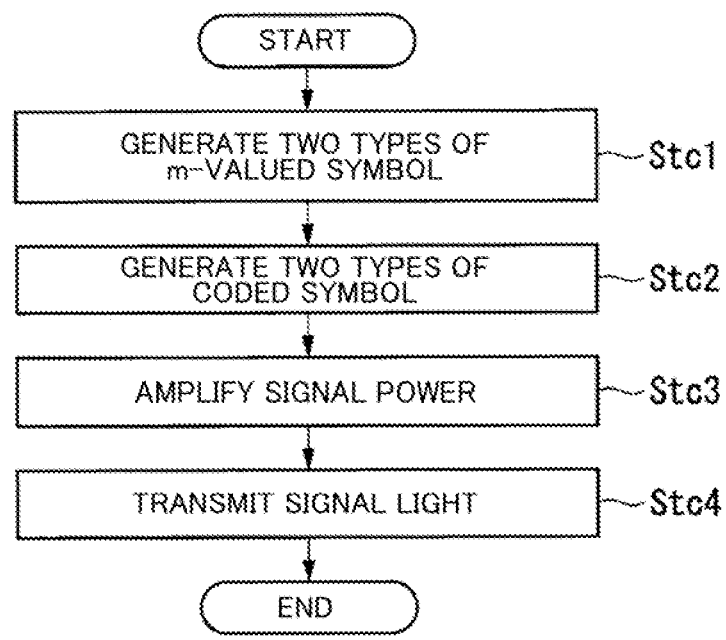
FIG. 13 is a flowchart illustrating the flow of processing by an optical transmitter according to the fourth embodiment.
Figure 14:
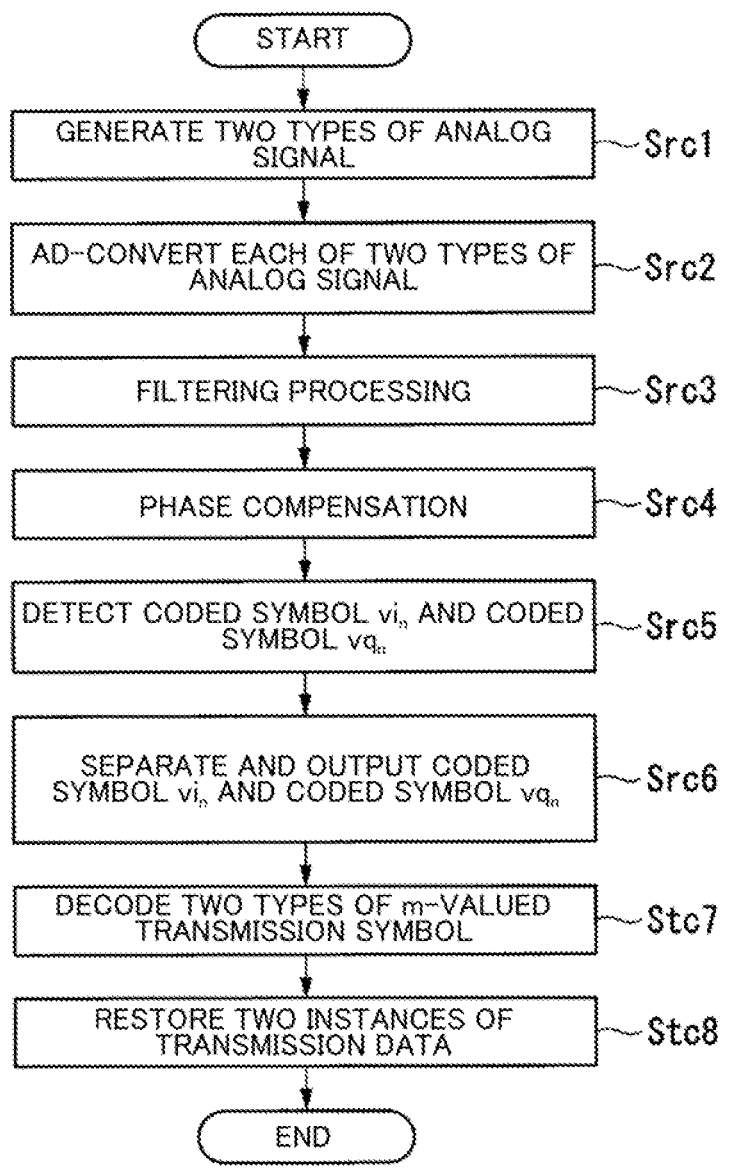
FIG. 14 is a flowchart illustrating the flow of processing by an optical receiver according to the fourth embodiment.

Processing performed by the optical transmission system 100c of the fourth embodiment will be described next. FIG. 13 is a flowchart illustrating the flow of processing by the optical transmitter 1c, and FIG. 14 is a flowchart illustrating the flow of processing by the optical receiver 2c.

The following will describe a case where m=4, $\alpha_1$=½, $\alpha_j$=0 (j=2, 3, . . . ), and a 16QAM signal is generated as the QAM signal to be generated.

The processing will be described according to the flowchart illustrating the flow of processing by the optical transmitter 1c illustrated in FIG. 13. Each of the I component signal generation unit 11-1 and the Q component signal generation unit 11-2 of the signal generation unit 11c takes in the transmission data provided thereto and generates a Gray-coded four-valued transmission symbol $u_n$ from the taken-in transmission data (Step Stc1). Hereinafter, the four-valued transmission symbol $u_n$ generated by the I component signal generation unit 11-1 will be referred to as a four-valued transmission symbol $ui_n$. The four-valued transmission symbol $u_n$ generated by the Q component signal generation unit 11-2 will be referred to as a four-valued transmission symbol $uq_n$. The types of symbols contained in the four-valued transmission symbol $ui_n$ are (0, 1, 2, 3), and the types of symbols contained in the four-valued transmission symbol $uq_n$ are also (0, 1, 2, 3).

The I component signal coding unit 12-1 performs nonlinear coding as indicated by Equation (5) and Equation (6) on the four-valued transmission symbol $ui_n$ generated by the I component signal generation unit 11-1. When m=4 and $\alpha_1$=½, M=6, and thus the I component signal coding unit 12-1 generates a six-valued coded symbol $vi_n$ (0, 1, 2, 3, 4, 5). The Q component signal coding unit 12-2 performs nonlinear coding as indicated by Equation (5) and Equation (6) on the four-valued transmission symbol $uq_n$ generated by the Q component signal generation unit 11-2, and generates a six-valued coded symbol $vq_n$ (0, 1, 2, 3, 4, 5) (step Stc2).

The DA converter 131-1 converts a digital signal, which is the series of six-valued coded symbols $vi_n$ (0, 1, 2, 3, 4, 5) generated by the I component signal coding unit 12-1, into an analog signal and outputs the analog signal. The electrical amplifier 132-1 amplifies the signal power of the analog signal output by the DA converter 131-1 and outputs the amplified signal to the optical vector modulator 135.

The DA converter 131-2 converts a digital signal, which is the series of six-valued coded symbols $vq_n$ (0, 1, 2, 3, 4, 5) generated by the Q component signal coding unit 12-2, into an analog signal and outputs the analog signal. The electrical amplifier 132-2 amplifies the signal power of the analog signal output by the DA converter 131-2 and outputs the amplified signal to the optical vector modulator 135 (step Stc3).

The optical vector modulator 135 performs optical complex amplitude modulation on the continuous light output by the signal light source 133 on the basis of the series of coded symbols $vi_n$ output by the electrical amplifier 132-1 and the series of coded symbols $vi_n$ output by the electrical amplifier 132-2 to generate a 36-valued optical complex amplitude modulation signal (called "NLTCQ" hereinafter). NLTCQ is an acronym of "Nonliner trellis coded QAM". The optical vector modulator 135 transmits the generated NLTCQ signal to the optical receiver 2c through the optical fiber transmission line 3 (Step Stc4).

Here, assuming $r_{ij}$ represents the probability that the value of the In-Phase component is "i" and the value of the Quadrature component is "j", $r_{ij}=s_i \times s_j$. Here, $s_k$ (where k=0, 1, 2, 3, 4, 5) is the probability that each component has a value of "k." When m=4, $\alpha_1=\frac{1}{2}$, and $\alpha_j=0$ (j=2, 3, . . . ), a 6×6 matrix R having $r_{ij}$ as a component is represented by the following Equation (22).

[Math 22]

$$R = \begin{pmatrix} 1/256 & 3/256 & 4/256 & 4/256 & 3/256 & 1/256 \\ 3/256 & 9/256 & 12/256 & 12/256 & 9/2560 & 3/256 \\ 4/256 & 12/256 & 16/256 & 16/256 & 12/256 & 4/256 \\ 4/256 & 12/256 & 16/256 & 16/256 & 12/256 & 4/256 \\ 3/256 & 9/256 & 12/256 & 12/256 & 9/256 & 3/256 \\ 1/256 & 3/256 & 4/256 & 4/256 & 3/256 & 1/256 \end{pmatrix} \quad (22)$$

The processing will be described next according to the flowchart illustrating the flow of processing by the optical receiver 2c illustrated in FIG. 14. The coherent receiver 214 receives the signal light transmitted by the optical fiber transmission line 3, converts optical complex amplitude information of the NLTCQ signal into two types of analog electrical signals by coherent detection using the locally-generated light output by the locally-generated light source 213, and outputs the signals (step Src1).

Each of the AD converters 212-1 and 212-2 converts the analog electrical signal output by the coherent receiver 214 into a digital signal and outputs the digital signal (step Src2).

The IQ synthesizing unit 220 synthesizes the digital signals output by the AD converters 212-1 and 212-2 as a complex digital signal. The digital filter unit 221c performs filtering processing on the complex digital signal output by the IQ synthesizing unit 220 and outputs the digital signal after filtering to the phase compensation unit 227 (step Src3). The phase compensation unit 227 compensates for a phase difference between the locally-generated light output by the locally-generated light source 213 and the signal light, and outputs the complex digital signal after the phase compensation to the signal determination unit 222c and the subtractor 223c (step Src4).

The signal determination unit 222c performs threshold determination processing on the complex digital signal after the phase compensation to detect the six-valued coded symbol $vi_n$ and the six-valued coded symbol $vq_n$ (step Src5). The signal determination unit 222c outputs the detected six-valued coded symbol $vi_n$ and the six-valued coded symbol $vq_n$ to the IQ separating unit 228 and the subtractor 223c. The IQ separating unit 228 separates the coded symbol $vi_n$ and the coded symbol $vq_n$ output by the signal determination unit 222c by separating the real part and the imaginary part of the complex number, and outputs the separated symbols to the signal decoding units 225-1 and 225-2, respectively (step Src6).

The signal decoding unit 225-1 takes in the series of coded symbols $vi_n$ output by the IQ separating unit 228 and performs the operation indicated by Equation (7) above on the taken-in series of coded symbols $vi_n$ taken in, with m=4.

In other words, the signal decoding unit 225-1 decodes the four-valued transmission symbol $ui_n$ by performing an operation of dividing the six-valued coded symbol $vi_n$ by 4 to obtain the remainder value. The signal decoding unit 225-2 takes in the series of coded symbols $vq_n$ output by the IQ separating unit 228 and performs the operation indicated by Equation (7) above on the taken-in series of coded symbols $vq_n$ taken in, with m=4. In other words, the signal decoding unit 225-1 decodes the four-valued transmission symbol $uq_n$ by performing an operation of dividing the six-valued coded symbol $vq_n$ by 4 to obtain the remainder value (step Src7).

The bit demapping unit 226-1 demaps, i.e., Gray-decodes, the four-valued transmission symbol $ui_n$ decoded by the signal decoding unit 225-1 to restore the bit data of the transmission data. The bit demapping unit 226-2 demaps, i.e., Gray-decodes, the four-valued transmission symbol $uq_n$ decoded by the signal decoding unit 225-2 to restore the bit data of the transmission data (step Src8).

In parallel with the above-described processing, the subtractor 223c subtracts the output value of the phase compensation unit 227 from the output value of the signal determination unit 222c, and outputs the subtraction value obtained by the subtraction to the tap update unit 224c. The tap update unit 224c calculates new tap coefficients so as to minimize the subtraction value output by the subtractor 223c, and outputs the calculated tap coefficients to the digital filter unit 221c.

In the fourth embodiment described above, in the optical transmitter 1c, the signal generation unit 11c includes the I component signal generation unit 11-1 and the Q component signal generation unit 11-2, each of which generates m-valued transmission symbols on the basis of the transmission data provided thereto. The signal coding unit 12c includes the I component signal coding unit 12-1 that takes in the m-valued transmission symbol $ui_n$ generated by the I component signal generation unit 11-1, and the Q component signal coding unit 12-2 that takes in the m-valued transmission symbol $uq_n$ generated by the Q component signal generation unit 11-2. The I component signal coding unit 12-1 and the Q component signal coding unit 12-2 generate the coded symbol $vi_n$ and the coded symbol $vq_n$, respectively, as symbols for transmission, through a predetermined coding method that performs the nonlinear coding indicated by Equation (5) and Equation (6), using $\alpha_j$, which is a real number no less than 0 and no greater than 1 and that is predetermined such that M>m. The transmission unit 13c generates signal light by performing optical complex amplitude modulation on the basis of the coded symbol $vi_n$ generated by the I component signal coding unit 12-1 and the coded symbol $vq_n$ generated by the Q component signal coding unit 12-2, and transmits the generated signal light. In the optical receiver 2c, the reception unit 21c receives the signal light to be transmitted by the optical transmitter 1c and generates two types of series of digital signals by coherent detection of the received signal light. The digital signal processing unit 22c applies predetermined digital signal processing to each of the two types of series of digital signals to detect the I component M-valued coded symbol $vi_n$ and the Q component M-valued coded symbol $vq_n$, decodes the I component m-valued transmission symbol $ui_n$ by performing the operation of Equation (7), which calculates the remainder obtained by dividing each of the detected I component coded symbols $vi_n$ by m, decodes the Q component m-valued transmission symbol $uq_n$ by performing the operation of Equation (7), which calculates the remainder obtained by dividing each of the detected Q component coded symbols $vq_n$ by m, and restores the transmission data from each of the decoded series of I component m-valued transmission symbols $ui_n$ and Q component m-valued transmission symbols $uq_n$. This makes it possible to narrow the signal spectrum without one symbol determination error for the coded signal inducing two or more symbol determination errors for the uncoded signal.

Note that the other example of the configuration of the first embodiment may be applied to the foregoing fourth embodiment. In this case, the I component signal coding unit 12-1 generates the intermediate symbol $\sim ui_n$ calculated through Equation (6) as a symbol for transmission, and the Q component signal coding unit 12-2 generates the intermediate symbol $\sim uq_n$ calculated through Equation (6) as a symbol for transmission. Because Equation (5) is performed through predetermined digital signal processing, the digital filter unit 221c of the digital signal processing unit 22c performs the filtering processing by implementing the operation of Equation (5) and the waveform shaping processing in an adaptive manner using the tap coefficients.

Note that the configuration of the second embodiment may be applied to the foregoing fourth embodiment. In this case, the I component signal coding unit 12-1 and the Q component signal coding unit 12-2 perform nonlinear coding as indicated by Equation (13) and Equation (14). If the other example of the configuration of the first embodiment is applied along with the configuration of the second embodiment, the I component signal coding unit 12-1 will generate the intermediate symbol $\sim ui_n$ calculated through Equation (14) as the symbol for transmission, and the Q component signal coding unit 12-2 will generate the intermediate symbol $\sim uq_n$ calculated through Equation (14) as the symbol for transmission. Because Equation (13) is performed through predetermined digital signal processing, the digital filter unit 221c of the digital signal processing unit 22c performs the filtering processing by implementing the operation of Equation (13) and the waveform shaping processing in an adaptive manner using the tap coefficients.

Additionally, in the foregoing third and fourth embodiments, the signal decoding units 225, 225-1, and 225-2 may perform decoding by MLSE instead of through Equation (7).

The signal generation units 11 and 11c and the signal coding units 12, 12a, and 12c of the optical transmitters 1, 1a, 1b, and 1c, and the digital signal processing units 22, 22b, and 22c of the optical receivers 2, 2b, and 2c in the foregoing embodiments may be realized by a computer. In this case, a program for implementing the functions thereof may be recorded in a computer-readable recording medium, and the functions may be implemented by loading the program recorded in the recording medium into a computer system and executing the program. Here, "computer system" is assumed to include an OS, hardware such as peripheral devices, and the like. Additionally, "computer-readable recording medium" refers to a portable medium such as a flexible disk, a magneto-optical disk, ROM, a CD-ROM, or the like, or a storage device such as a hard disk which is built into the computer system. Furthermore, the "computer-readable recording medium" may also include a medium which holds the program for a set length of time, e.g., a medium that holds a program dynamically for a short period of time, such as a communication line in the case of transmitting a program over a network such as the Internet or a communication line such as a telephone line, or volatile memory within the computer system that serves as a server or client in such a case. The stated program may implement only some of the above-described functions, and may further be capable of implementing the above-described functions in combination with programs already recorded in the computer system, or may be implemented using a programmable logic device such as an FPGA (Field Programmable Gate Array).

Although embodiments of this invention have been described in detail above with reference to the drawings, the specific configuration is not limited to the embodiment, and designs and the like within the scope of the present invention are included.

INDUSTRIAL APPLICABILITY

The optical transmission system restores transmission data on the basis of strength information or complex amplitude information obtained by direct or coherent detection of transmitted signal light, and can be applied in optical transmission systems for the purpose of generating and demodulating narrow-band spectrum signals.

REFERENCE SIGNS LIST

1, 1a, 1b, 1c Optical transmitter
11, 11c Signal generation unit
11-1 I component signal generation unit
11-2 Q component signal generation unit
12, 12a, 12c Signal coding unit
12-1 I component signal coding unit
12-2 Q component signal coding unit
13, 13b Transmission unit
131, 131-1, 131-2 DA converter
132, 132-1, 132-2 Electrical amplifier
133 Signal light source
134 Optical modulator
135 Optical vector modulator
2, 2b Optical receiver
21, 21b, 21c Reception unit
211 Photoreceptor
212 AD converter
213 Locally-generated light source
214 Coherent receiver
22, 22b, 22c Digital signal processing unit
220 IQ synthesizing unit
221, 221c Digital filter unit
222, 222c Signal determination unit
223, 223c Subtractor
224, 224c Tap update unit
225, 225-1, 225-2 Signal decoding unit
226, 226-1, 226-2 Bit demapping unit
227 Phase compensation unit
228 IQ separating unit
3 Optical fiber transmission line
100 Optical transmission system

The invention claimed is:

1. An optical transmission system comprising an optical transmitter that transmits signal light and an optical receiver that receives the signal light, wherein the optical transmitter includes:
a signal coding unit that generates a symbol for transmission by applying a predetermined coding method to a series of m-valued transmission symbols generated from transmission data; and
a transmission unit that generates the signal light by performing optical modulation on the basis of the symbol for transmission, and transmits the generated signal light, the optical receiver includes:

a reception unit that receives the signal light and generates a series of digital signals from the received signal light; and a digital signal processing unit that detects a coded symbol by applying predetermined digital signal processing to the series of digital signals, decodes the m-valued transmission symbol from the detected coded symbol, and restores the transmission data from the decoded m-valued transmission symbol, and an operation based on the predetermined coding method includes an operation of generating an intermediate symbol as the symbol for transmission through nonlinear coding that generates the coded symbol by generating an m-valued intermediate symbol from the m-valued transmission symbol, the nonlinear coding restricting transitions between series of the coded symbols in time series by assigning bit information to a state transition between coded symbols adjacent in time series and making a number of states that each of the coded symbols can take on greater than a number of states of the m-valued transmission symbol, and when the intermediate symbol is generated as the symbol for transmission through the predetermined coding method, the coded symbol is generated from the intermediate symbol through the predetermined digital signal processing.

2. The optical transmitter of the optical transmission system according to claim 1, wherein when generating the coded symbol as the symbol for transmission through the predetermined coding method, and each of the m-valued transmission symbols at a time n is represented by un and each of the coded symbols is represented by $v_n$, the signal coding unit generates an M-valued coded symbol $v_n$ as the symbol for transmission through the predetermined coding method that performs the nonlinear coding represented by Equation (1) and Equation (2), which are indicated by $\alpha_j$, which is a real number no less than 0 and no greater than 1 and that is predetermined such that M>m, a Gauss symbol [•] indicating a Gaussian operation, and mod (•,m) indicating an operation for finding a remainder value from dividing by m, and the transmission unit transmits the signal light generated based on the coded symbol $v_n$.

$$\tilde{u}_n = \text{mod } (u_n - [\Sigma_{j=1}^\infty \alpha_j v_{n-j}], m) \quad (1)$$

$$v_n = \tilde{u}_n + [\Sigma_{j=1}^\infty \alpha_j v_{n-j}] \quad (2)$$

3. The optical transmitter of the optical transmission system according to claim 1, wherein when generating the coded symbol as the symbol for transmission through the predetermined coding method, and each of the m-valued transmission symbols at a time n is represented by $u_n$ and each of the coded symbols is represented by $v_n$, the signal coding unit generates an M-valued coded symbol v as the symbol for transmission through the predetermined coding method that performs the nonlinear coding represented by Equation (3) and Equation (4), which are indicated by $\beta_j$, which is a real number no less than 0 and no greater than 1,$\alpha_j$, which is a real number no less than 0 and no greater than 1 and that is predetermined such that M>m, a Gauss symbol [•] indicating a Gaussian operation, and mod (•,m) indicating an operation for finding a remainder value from dividing by m, and the transmission unit transmits the signal light generated based on the coded symbol $v_n$.

$$\tilde{u}_n = \text{mod } (u_n - [\Sigma_{j=1}^\infty \alpha_j \tilde{u}_{n-j} + \Sigma_{j=1}^\infty \beta_j v_{n-j}], m) \quad (3)$$

$$v_n = \tilde{u}_n + [\Sigma_{j=1}^\infty \alpha_j \tilde{u}_{n-j} + \Sigma_{j=1}^\infty \beta_j v_{n-j}] \quad (4)$$

4. The optical transmitter of the optical transmission system according to claim 1, further comprising:

an I component signal generation unit and a Q component signal generation unit that each generates the m-valued transmission symbol on the basis of the transmission data when the coded symbol is generated as the symbol for transmission through the predetermined coding method, wherein each of the m-valued transmission symbols at a time n is represented by un and each of the coded symbols is represented by $v_n$, each signal coding unit generates an M-valued coded symbol v as the symbol for transmission through the predetermined coding method that performs the nonlinear coding represented by Equation (5) and Equation (6), which are indicated by $\alpha_j$, which is a real number no less than 0 and no greater than 1 and that is predetermined such that M>m, a Gauss symbol [•] indicating a Gaussian operation, and mod (•,m) indicating an operation for finding a remainder value from dividing by m, and takes the generated coded symbols $v_n$ as a coded symbol $vi_n$ and a coded symbol $vq_n$, respectively, and the transmission unit transmits the signal light generated based on the coded symbol yin and the coded symbol $vq_n$.

$$\tilde{u}_n = \text{mod } (u_n - [\Sigma_{j=1}^\infty \alpha_j v_{n-j}], m) \quad (5)$$

$$v_n = \overline{u}_n + [\Sigma_{j=1}^\infty \alpha_j v_{n-j}] \quad (6)$$

5. The optical transmitter according to claim 1, when the coded symbol is generated as the symbol for transmission through the predetermined coding method of the optical transmission system, the optical transmitter further including:

an I component signal generation unit and a Q component signal generation unit that each generates the m-valued transmission symbol on the basis of the transmission data, wherein each of the m-valued transmission symbols at a time n is represented by un and each of the coded symbols is represented by $v_n$, each signal coding unit generates an M-valued coded symbol $v_n$ as the symbol for transmission through the predetermined coding method that performs the nonlinear coding represented by Equation (7) and Equation (8), which are indicated by $\beta_j$, which is a real number no less than 0 and no greater than 1, $\alpha_j$, which is a real number no less than 0 and no greater than 1 and that is predetermined such that M>m, a Gauss symbol [•] indicating a Gaussian operation, and mod (•,m) indicating an operation for finding a remainder value from dividing by m, and takes the generated coded symbols $v_n$ as a coded symbol $vi_n$ and a coded symbol $vq_n$, respectively, and the transmission unit transmits the signal light generated based on the coded symbol $vi_n$ and the coded symbol $vq_n$.

$$\tilde{u}_n = \mathrm{mod}\ (u_n - [\Sigma_{j=1}^\infty \alpha_j \tilde{u}_{n-j} + \Sigma_{j=1}^\infty \beta_j v_{n-j}], m) \quad (7)$$

$$v_n = \tilde{u}_n + [\Sigma_{j=1}^\infty \alpha_j \tilde{u}_{n-j} + \Sigma_{j=1}^\infty \beta_j v_{n-j}] \quad (8)$$

6. The optical receiver of the optical transmission system, wherein the reception unit:

receives the signal light to be transmitted by the optical transmitter according to claim 2, and generates the series of digital signals by directly detecting the received signal light, and the digital signal processing unit:

detects the coded symbol vn by applying the predetermined digital signal processing to the series of digital signals, decodes the m-valued transmission symbol by calculating a remainder obtained by dividing each of the detected coded symbols $v_n$ by m, and restores the transmission data from the decoded series of m-valued transmission symbols.

7. The optical receiver of the optical transmission system, wherein the reception unit:

receives the signal light to be transmitted by the optical transmitter according to claim 4, and generates two types of the series of digital signals by coherent detection of the received signal light, and the digital signal processing unit:

applies the predetermined digital signal processing to each of the two types of the series of digital signals, detects the M-valued coded symbol $vi_n$ of the I component and the M-valued coded symbol $vq_n$ of the Q component, decodes the m-valued transmission symbol of the I component by calculating a remainder obtained by dividing each of the detected m-valued coded symbols $vi_n$ of the I component by m, decodes the m-valued transmission symbol of the Q component by calculating a remainder obtained by dividing each of the detected m-valued coded symbols $vq_n$ of the Q component by m, and restores the transmission data from each of the series of decoded m-valued transmission symbols of the I component and the Q component.

\* \* \* \* \*